United States Patent
Gemma et al.

[11] Patent Number: 5,675,532
[45] Date of Patent: Oct. 7, 1997

[54] RECORDING MEDIUM AND RECORDING/REPRODUCTION METHOD

[75] Inventors: Nobuhiro Gemma; Syun Egusa; Kuniyoshi Tanaka; Hiroyuki Hieda; Katsuyuki Naito, all of Yokohama, Japan

[73] Assignee: Kabushiki Kaisha Toshiba, Kawasaki, Japan

[21] Appl. No.: 507,907

[22] Filed: Jul. 27, 1995

[30] Foreign Application Priority Data

Jul. 28, 1994 [JP] Japan .................................. 6-176988
Nov. 18, 1994 [JP] Japan .................................. 6-285360

[51] Int. Cl.$^6$ .................................................. G11C 13/00
[52] U.S. Cl. ........................ 365/151; 365/106; 365/120
[58] Field of Search ................................. 365/120, 127, 365/151, 106, 107

[56] References Cited

U.S. PATENT DOCUMENTS 4,575,822  3/1986  Quate .

FOREIGN PATENT DOCUMENTS 3-263633  11/1991  Japan .

OTHER PUBLICATIONS

"Ionization Energies of Free Molecules and Molecular Solids" K. Seki *Mol. Cryst. Liq. Cryst* 1989 vol. 171 pp. 255–270.

"Experimental Determination of Electron Affinities of Organic Molecules" E.C.M. Chan *Mol. Cryst. Liq. Cryst.* 1989 vol. 171 pp. 271–285.

American Institute of Physics, J. Appl. Phys. 70 (5), 1 Sep. 1991, Charge Storage in a Nitride–Oxide–Silicon Medium by Scanning Capacitance Microscopy, R.C. Barrett et al., pp. 2725–2733.

*Primary Examiner*—Terrell W. Fears
*Attorney, Agent, or Firm*—Oblon, Spivak, McClelland, Maier & Neustadt, P.C.

[57] ABSTRACT

A recording medium includes an underlying conductor layer, an insulating layer formed on the underlying conductor layer, and a recording layer formed with a domain structure on the insulating layer, wherein the recording layer contains a domain constituent material and an impurity whose molar ratio to the domain constituent material is 10% or lower, and the highest occupied molecular orbital of the impurity is higher in energy than the highest occupied molecular orbital of the domain constituent element, or the lowest unoccupied molecular orbital of the impurity is lower in energy than the lowest unoccupied molecular orbital of the domain constituent material.

20 Claims, 11 Drawing Sheets

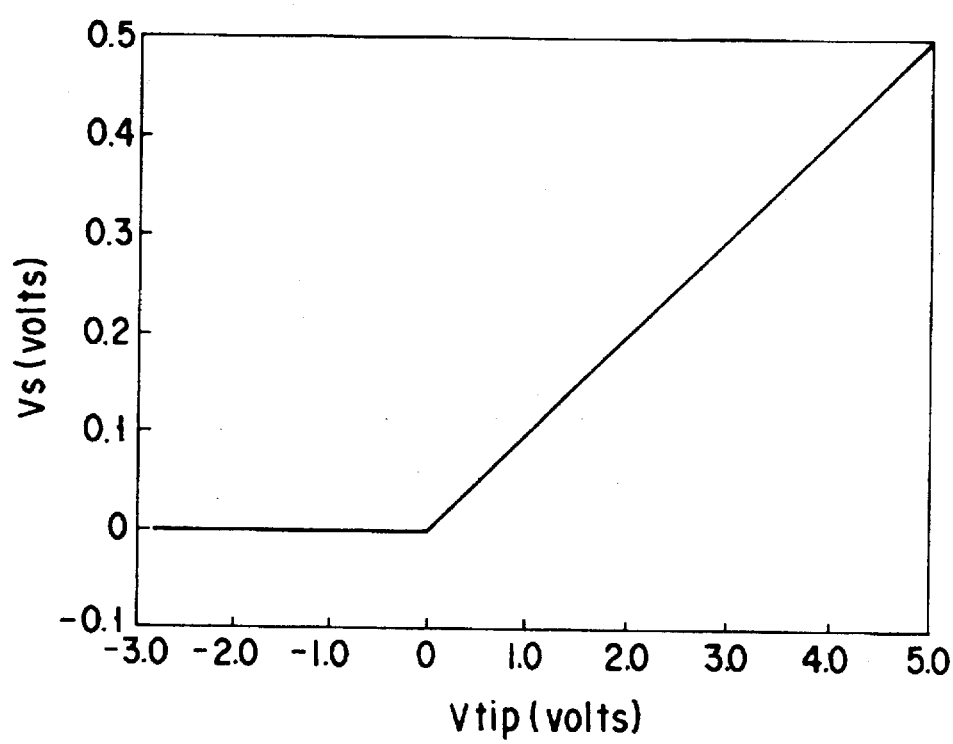
F I G. 5
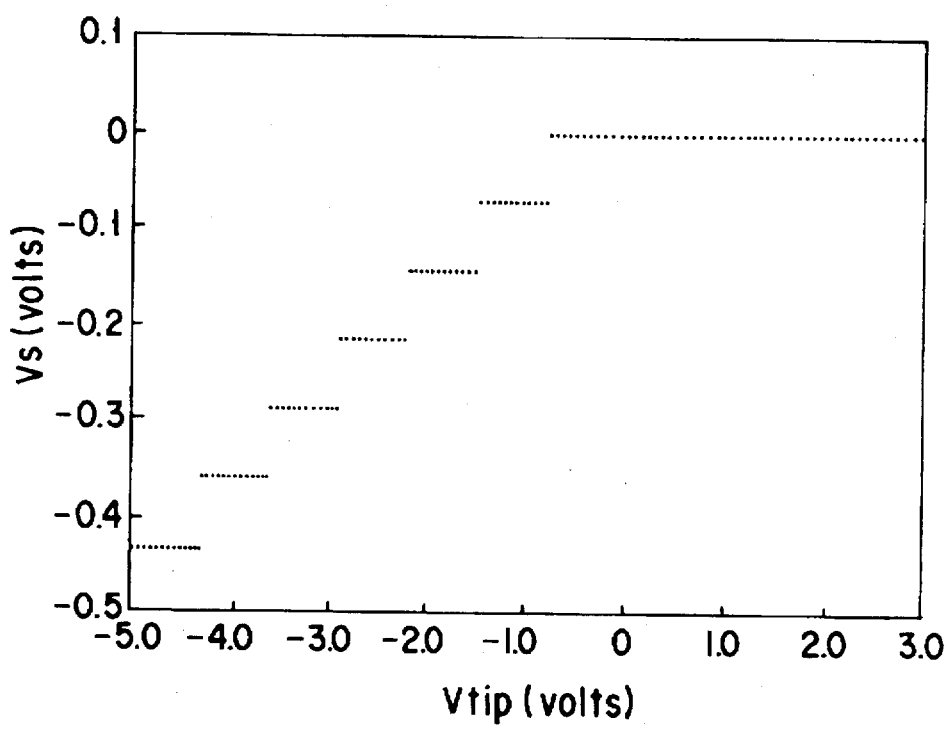
F I G. 6

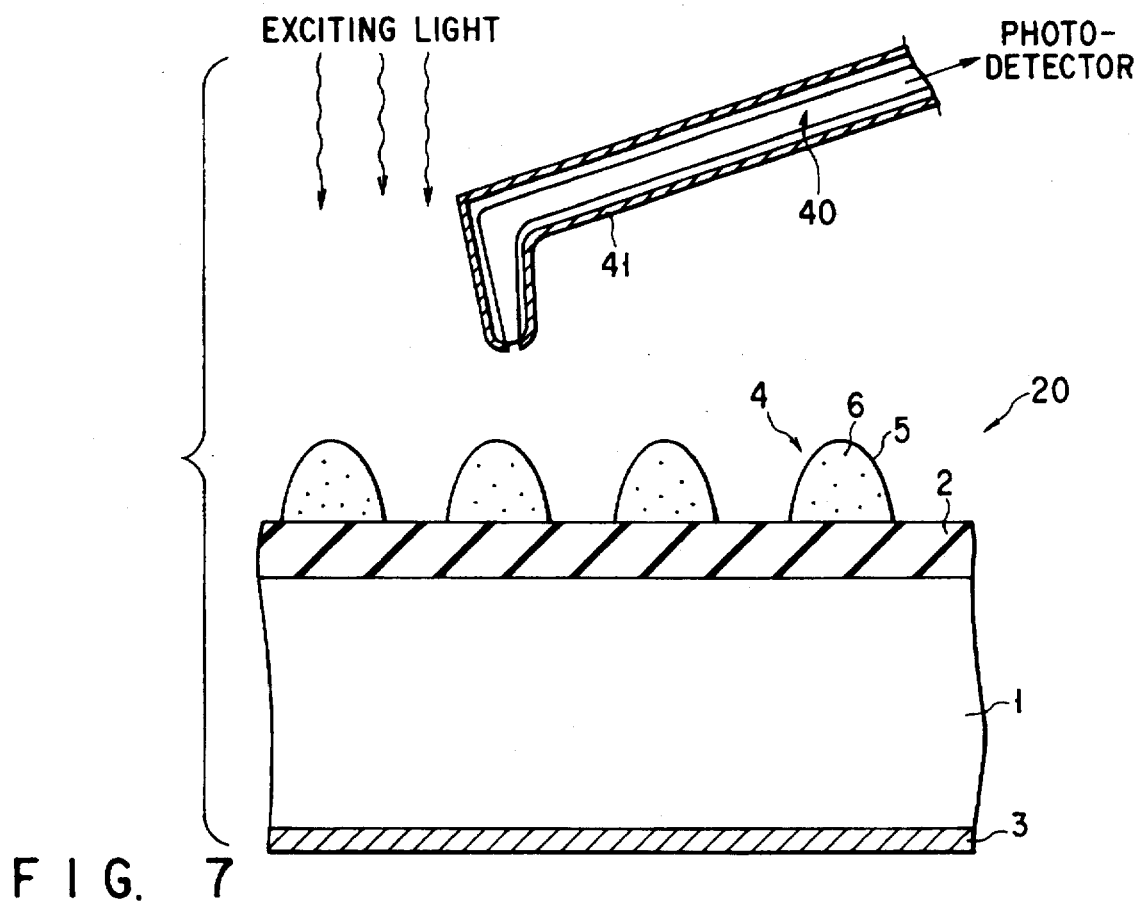
F I G. 7
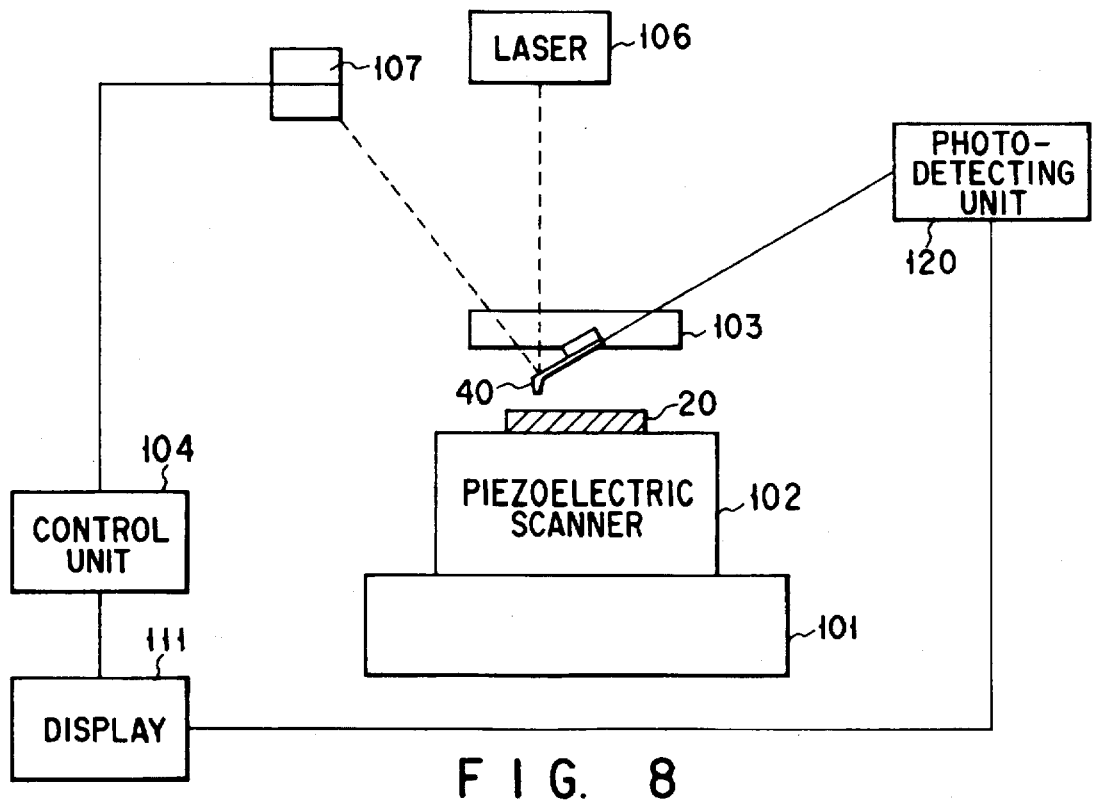
F I G. 8

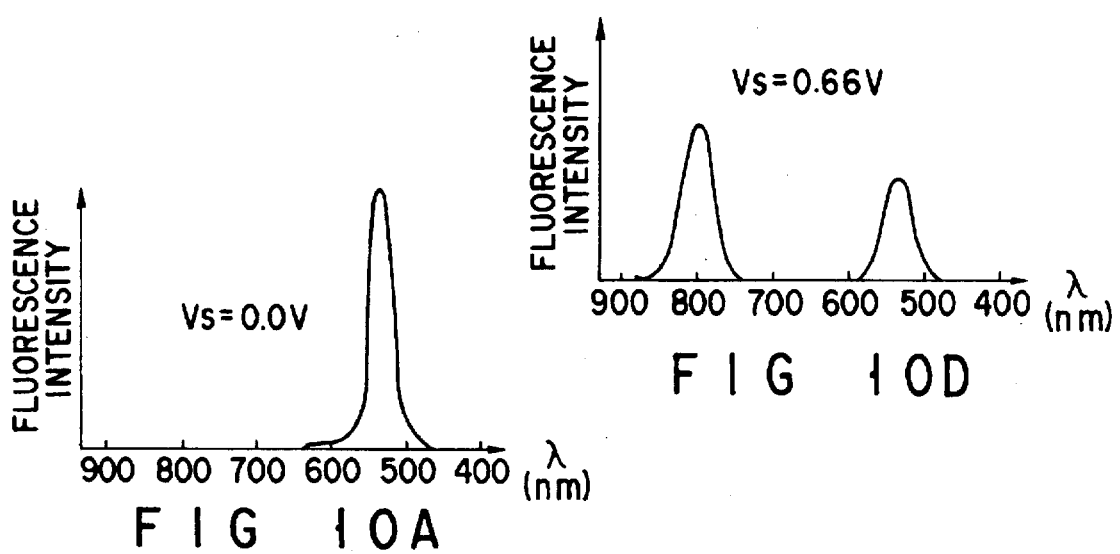
FIG 10A
FIG 10D
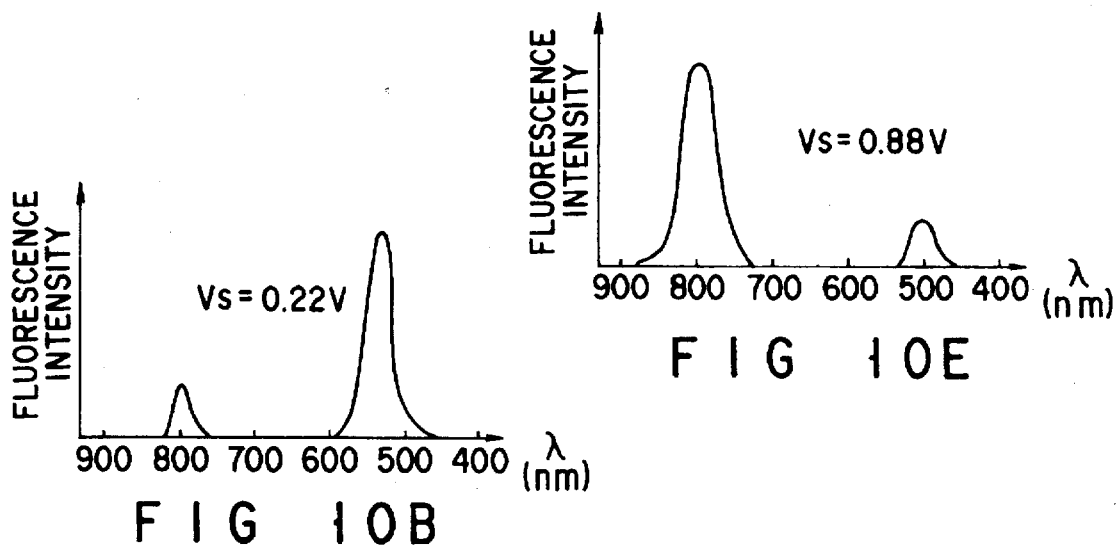
FIG 10B
FIG 10E
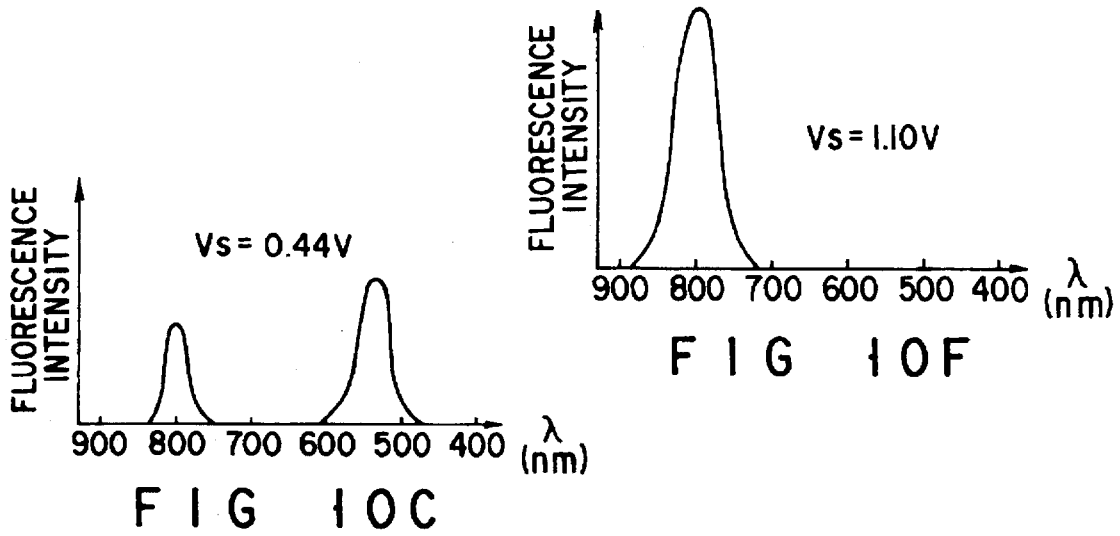
FIG 10C
FIG 10F

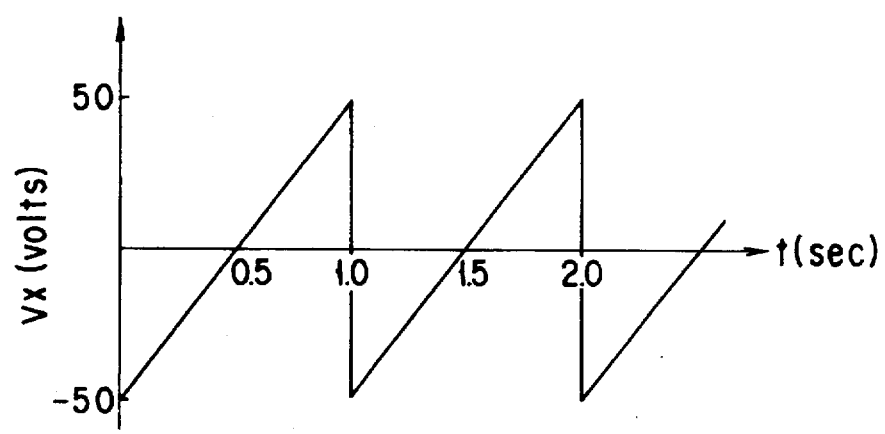
F I G. 13A
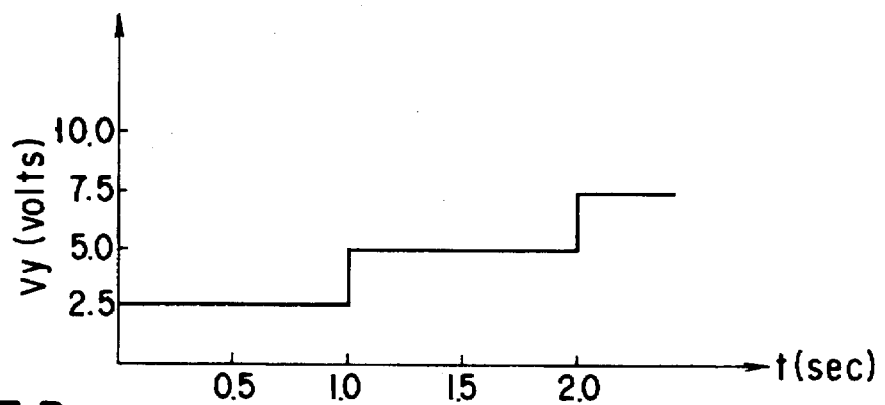
F I G. 13B
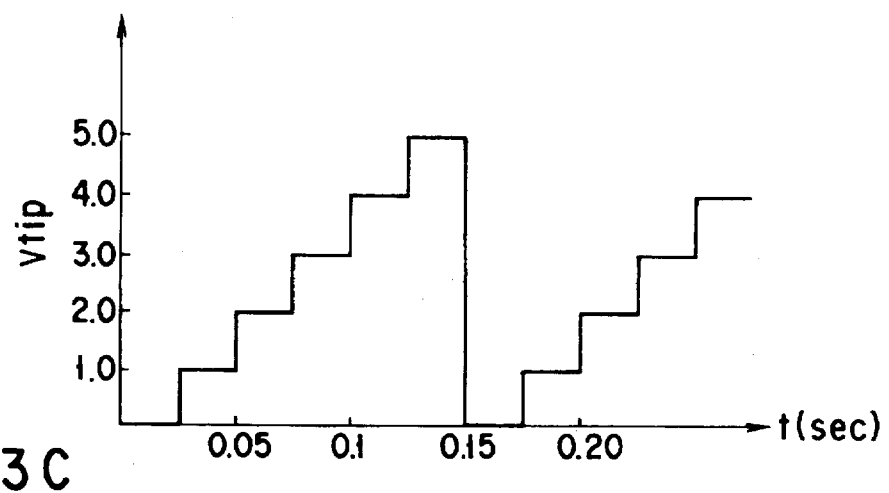
F I G. 13C

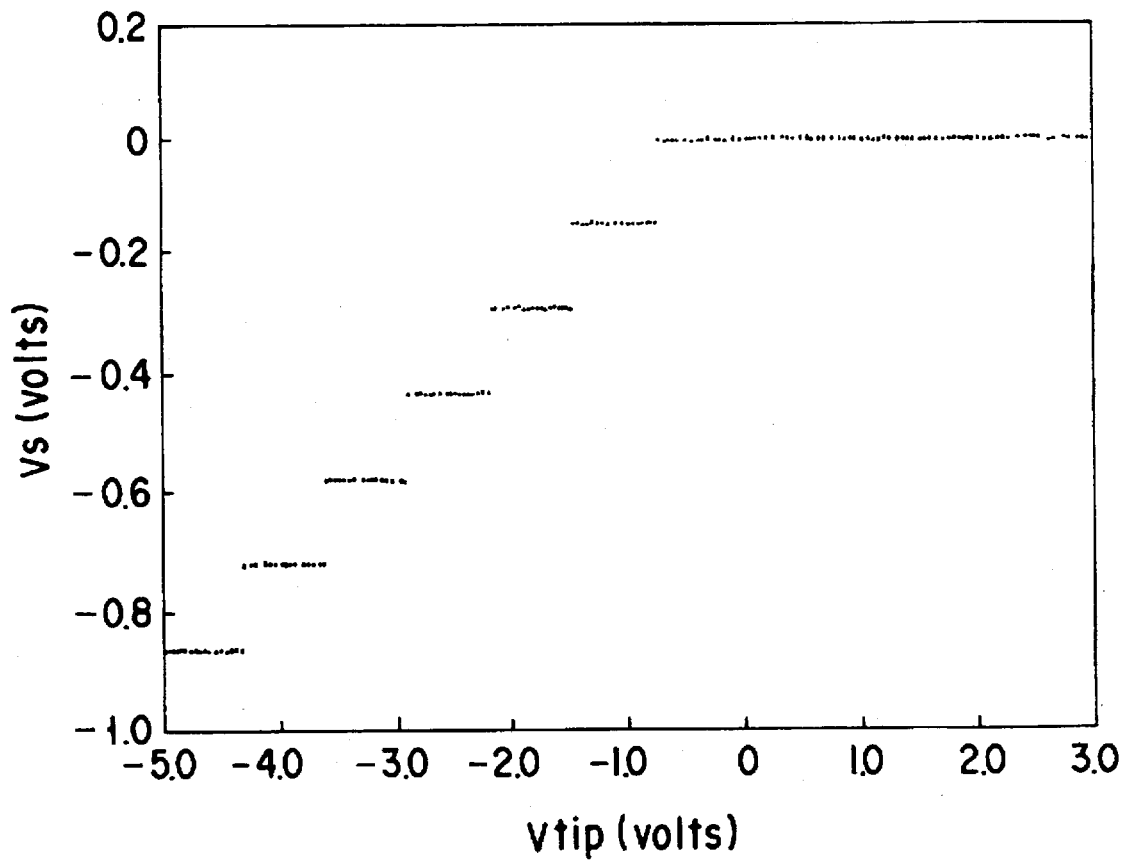
F I G. 15

RECORDING MEDIUM AND RECORDING/REPRODUCTION METHOD

BACKGROUND OF THE INVENTION

1. Field of the Invention

The present invention relates to a recording medium and a recording/reproduction method for this recording medium.

2. Description of the Related Art

Recently, formation of fine tunnel junctions is becoming possible with development of the microprocessing technologies. Accordingly, research of a single electron device using a Coulomb blockade phenomenon resulting from the electron's nature as a particle is being extensively done. In practice, stepwise current-voltage characteristics resulting from the tunneling phenomenon of a single electron are observed when submicron fine tunnel junctions are formed, so the development of a novel device capable of freely controlling such a characteristic change is expected. To observe the tunneling phenomenon of a single electron it is necessary that a change in the electrostatic energy upon tunneling of one electron be larger than the thermal energy. To meet this condition, a junction whose junction capacitance is very small must be formed. Unfortunately, it is very difficult to form a device with which a single electron tunnel effect can be observed at room temperature, because of the limits of processable dimensions of semiconductors and metals in present situations. For this reason, most single electron tunneling phenomena reported previously were observed under cryogenic conditions. It is needless to say that in applying the single electron effect to device, it is advantageous to be able to operate under room temperature, conditions, rather than cryogenic conditions. Therefore, reports of the single electron effect observed at room temperature will be described first.

(1) Yano et al. have reported a memory using polysilicon grains as a channel (K. Yano et al., IEDM Tech. Digest, p. 541 (1993)). They formed a 4-nm thick channel containing a large number of polysilicon grains with grain size of 10 nm by annealing a thin film of amorphous silicon, thereby fabricating a device with a gate length of 100 nm, a gate width of 100 nm, and a gate oxide film thickness of 150 nm. In this device, a discontinuous change in the threshold voltage was detected as a result of trap of one electron, tunneling from the gate electrode, into a grain in the vicinity of the channel. This polysilicon grain has a very small capacitance and is therefore suitable for observation of the Coulomb blockade phenomenon at room temperature.

This device, however, has a structure in which a large number of polysilicon grains exist in the channel, so it is uncertain into which grain an electron tunnels from the gate electrode. Also, a region into which a single electron is injected and a region through which a current flows are present in the same channel, i.e., they are not spatially separated. Consequently, the positional relationship between the conduction channel formed in a polysilicon grain and the grain which raps one electron also is uncertain. The result is that the device has poor controllability and reproducibility of the device characteristics such as the voltage at which the single electron tunnel effect occurs and the change width of the threshold voltage.

(2) Nejoh et al. have reported observation of a tunneling current through liquid crystal molecules using a probe of a scanning tunneling microscope (STM) (H. Nejoh, Nature 353, 640 (1991); Nejoh et al., Shingaku Giho, Vol. 93, No. 524, p. 25). They formed an island-like metal film on an insulating substrate and dropped droplets of liquid crystal molecules, thereby forming a structure in which the liquid crystal molecules were present between the islands. Stepwise current characteristics were observed when the potential was changed by approaching the STM probe to the structure. Also, when the structure was driven with a constant current by connecting external electrodes to the two ends the island-like metal film, it was confirmed that voltage across the island-like metal film periodically changed with changes in the potential of the STM probe. In this structure, the size of the metal islands, the spacing between the islands, and the size of the liquid crystal molecules were all nearly 2 nm. It is therefore considered that the liquid crystal molecules and the metal islands formed a two-dimensional tunnel junction array, and this made the observation of the Coulomb blockade at room temperature feasible.

Unfortunately, the spacing between the electrodes at the two ends of the two-dimensional array is of the order of mm, and a large number of tunnel junctions exist between them. Since it is in principle impossible to control a number of tunnel junctions with a single STM probe, the controllability of the device characteristics is significantly degraded. Also, the structure suffers low reproducibility of the current characteristics because it is not possible to specify which metal island or liquid crystal molecule the current flows through.

As described above, some observations of tunneling of a single electron at room temperature in a single electron device are reported. However, a spatial region through which an electron tunnels has not been controlled, so it is still impossible to control the device characteristics.

With the development of technologies represented by a scanning tunneling microscope, which was employed by Nejoh et al., or an atomic force microscope (AFM), it is becoming possible to evaluate or manipulate the structures and the physical properties on the atomic and molecular levels. Although these technologies are still on the stage of basic research, it is expected that entirely novel devices are invented in the future, which operate on the basis of the principles of the structural manipulation and the physical property control on the atomic and molecular levels. At present no definite concept relating to such devices has been proposed yet, but the following researches are attracting attention in this direction.

(3) Barrett et al. have reported a research aiming to realize very-high-density recording on the atomic and molecular levels using a probe of an STM or an AFM (J. Appl. Phys. 70, 2725 (1991)). In this research, a metal-coated AFM probe is brought into contact with an Si/SiO$_2$/SiN structure with a voltage applied, thereby tunnel-injecting carriers from Si into the SiO$_2$-SiN interface and performing write operation. The minimum carrier distribution obtained has a half width of 75 nm, and the density of the trapped carriers is $1.4 \times 10^{13}$ cm$^{-2}$.

It is unfortunate that this value roughly corresponds to 600 carriers, and this carrier number is larger in the order than in the case of a single electron device. Consequently, in this structure it is in principle not possible to control the number of carriers to be written. Therefore, it is considered that a device operation capable of setting the recording condition in accordance with the number of carriers is impossible.

(4) Among other reports, Jpn. Pat. Appln. KOKAI Publication No. 3-263633 has proposed a method in which carriers are injected into an island structure or a grain structure of a metal formed on a photoconductor by using a probe of an STM or an AFM, and the resultant structure is used as a memory.

This proposal, however, also does not at all mention the number of carriers to be injected, so it is considered that the number of carriers is in principle difficult to control.

Furthermore, when a device capable of controlling the number of carriers in a local region is assumed, it is important that the physical property to be measured largely change with a change in the carrier number. A change in the resistance is used in the single electron device mentioned above, and a change in the surface potential is used in recording in the Si/SiO$_2$/SiN structure. However, no attempts for observing changes in some other physical properties have been made. As an example, if optical properties or magnetic properties largely change with a change in the number of carriers, a wide variety of applications can be developed. Unfortunately, no such proposal has been made to date.

In this connection, the technologies making use of optical detection is attracting attention as an evaluating means on the atomic and molecular levels. For example, for impurity fluorescent molecules lightly doped into a molecular crystal, a fluorescence excitation spectrum as a signal from a single impurity molecule or a shift of the spectrum caused by the Stark effect is detected. Also, the image and spectrum of a single dye molecule are observed by using a near-field microscope capable of observing evanescent light in a local region. If these ultra-high-sensitivity photo-detecting technologies can be used, it may be possible to detect, at a high sensitivity, changes in the physical properties induced in local regions by using a probe of an STM or an AFM. However, no such attempts have been reported yet.

As described above, with the advance of the microprocessing technologies, the advance of the evaluation and manipulation technologies using a probe of an STM or an AFM, and the advance of the single-molecule spectral technologies, it may seen possible to realize a device based on the operating principles in which the number of carriers in a local region is controlled and a change in the physical properties with a change in the number of carriers is also controlled. It is unfortunate that presently no devices based on such concept have been proposed yet.

SUMMARY OF THE INVENTION it is an object of the present invention to provide a recording medium in which a recording condition corresponding to the number of carriers to be injected can be set, and which stably operates at room temperature and has a high controllability, and a recording/ reproduction method for this recording medium.

It is another object of the present invention to provide a recording medium based on a novel operating principle in which a change in the optical properties is controlled by controlling the number of carriers by using the fact that the optical properties change very greatly with a change in the number of carriers to be injected, and a recording/ reproduction method for this recording medium.

A first recording medium of the present invention comprises an underlying conductor layer, an insulating layer formed on the underlying conductor layer, and a recording layer formed with a domain structure on the insulating layer and capable of storing carriers, wherein the recording layer consists of donor organic molecules or acceptor organic molecules, and the medium satisfies a relation represented by $$d/(S\epsilon) \geq 2.86 \times 10^{-3} \quad (1)$$

where $d$ (nm) is a thickness of the insulating layer, $\epsilon$ is a relative dielectric constant of the insulating layer, and S (nm$^2$) is an area of each domain constituting the recording layer.

A recording/reproduction method for the first recording medium of the present invention comprises the steps of preparing a probe capable of being applied with a voltage, bringing the probe applied with a voltage into contact with a predetermined domain constituting a recording layer of the recording medium to perform recording by injecting carriers into the domain, detecting the carriers injected into the domain by scanning the probe applied with a voltage in a state of noncontacting with the domain, and erasing the carriers injected into the domain by bringing the probe applied, with a voltage having an opposite polarity to the polarity during the recording into contact with the domain.

A second recording medium of the present invention comprises an underlying conductor layer, an insulating layer formed on the underlying conductor layer, and a recording layer formed with a domain structure on the insulating layer and capable of storing carriers, wherein the recording layer contains a domain constituent material and an impurity whose molar ratio to the domain constituent material is 10% or lower, and a highest occupied molecular orbital of the impurity is higher in energy than a highest occupied molecular orbital of the domain constituent element, or a lowest unoccupied molecular orbital of the impurity is lower in energy than a lowest unoccupied molecular orbital of the domain constituent material.

A recording/reproduction method for the second recording medium of the present invention comprises the steps of preparing a probe capable of being applied with a voltage and capable of detecting fluorescence, bringing the probe applied with a voltage into contact with a predetermined domain constituting a recording layer of the recording medium to perform recording by injecting carriers into the domain, scanning the probe and detecting fluorescence emitted from an impurity in the domain upon irradiation of exciting light and having a correlation with the carriers stored in the domain, and erasing the carriers injected into the domain by bringing the probe applied with a voltage having an opposite polarity to the polarity during the recording into contact with the domain.

BRIEF DESCRIPTION OF THE DRAWINGS

FIG. 5 is a graph showing the relationship between the tip potential and the domain surface potential for a recording medium of Comparative Example;

FIG. 6 is a graph showing the relationship between the tip potential and the domain surface potential for a recording medium of Example 3;

FIG. 7 is a sectional view of a recording medium of Example 4;

FIG. 8 is a block diagram of a recording/reproduction system for the recording medium of Example 4;

FIGS. 10A to 10F are graphs showing the fluorescence spectra observed at various domain surface potential values for the recording medium of Example 4;

FIGS. 13A to 13C are graphs showing the voltage applied to piezoelectric devices in the x axis direction, the voltage applied to piezoelectric devices in the y axis direction, and the change in the tip voltage, respectively, when recording data is written in a recording medium of Example 6;

FIG. 15 is a graph showing the relationship between the tip potential and the domain surface potential for a recording medium of Example 7.

DETAILED DESCRIPTION OF THE PREFERRED EMBODIMENTS

Figure 1:
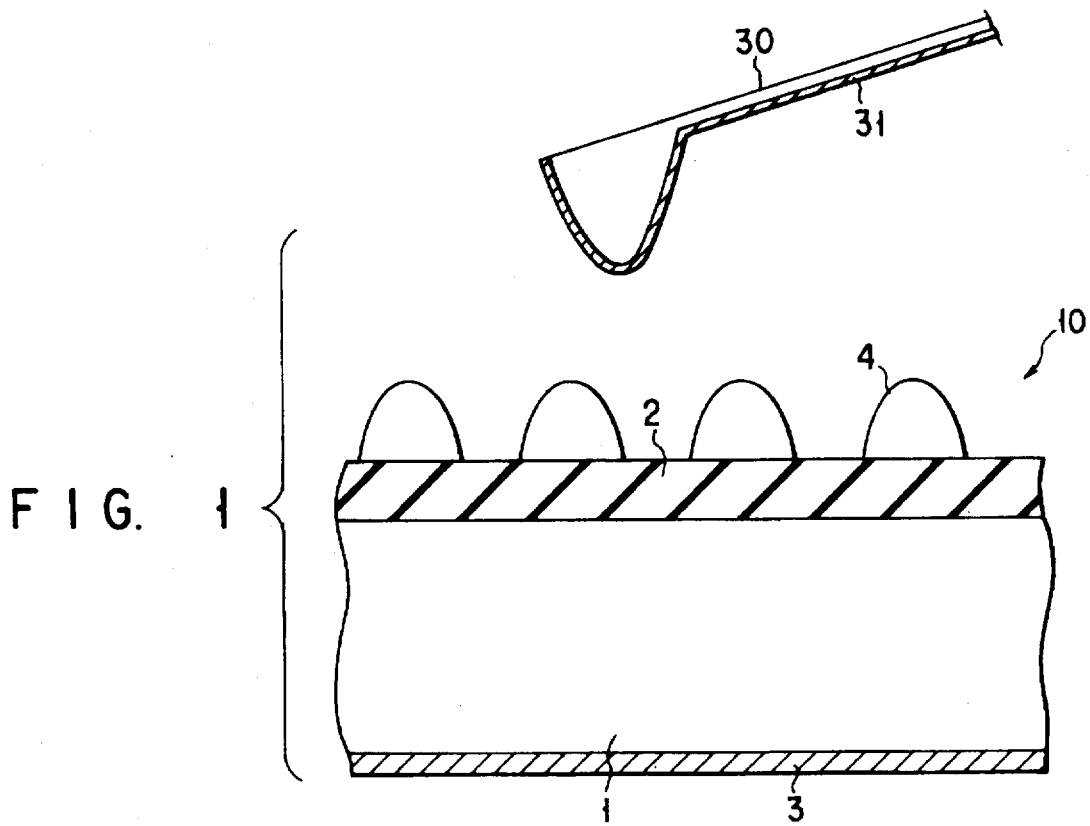
FIG. 1 is a sectional view of a recording medium of Example 1.

The first recording medium of the present invention will be described below.

A substrate made of a semiconductor such as silicon or a metal is an example of an underlying conductor layer which constitutes this recording medium, but the material is not particularly limited. Note that an backing electrode made from Cr or Au can be formed on the back side of the underlying conductor layer consisting of a semiconductor. Also, the material of an insulating layer is not particularly restricted, although a silicon oxide film is an example.

The conditions which the material of a recording layer constituting this recording medium must satisfy are that the material can form a domain structure, has an electron level close to the work function of the electrode material on the surface of a probe, and allows highly controllable injection of electrons or holes from the probe into the electron level and thereby enables storage of carriers.

An example of a suitable material of this recording layer is an organic molecule having a strong donor or acceptor property. When the recording layer consists of donor molecules, holes are injected from the probe into the highest occupied molecular orbital (HOMO). When the recording layer consists of acceptor molecules, electrons are injected from the probe into the lowest unoccupied molecular orbital (LUMO). It is desirable that the donor molecule have an ionization potential of 8 eV or less in the form of a solid crystal or a thin film, and that the acceptor molecule have an electron affinity of 1 eV or more in the form of a solid crystal or a thin film.

To form a recording layer with a domain structure by using organic molecules of this sort, it is possible to use a method in which a thin film is processed with an electron beam or an ion beam after being formed, or a method in which in the thin film formation process the film growth is stopped in a region with a small film thickness where no two-dimensional film is formed. Especially when donor or acceptor molecules which can be readily made amorphous are used, a large number of domains in the form of droplets having no large differences in the diameter and the height are formed in a region with a film thickness of several tens of nm or less, preferably 20 nm of less. The result is a good recording layer having a uniform domain structure as a whole. More specifically, the recording layer with the domain structure can be formed by depositing donor molecules or acceptor molecules onto the surface of the insulating layer while controlling the film thickness, which can be monitored using a suitable means such as a quartz oscillator, to be 20 nm or less. The surface of the insulating layer may be subjected to hydrophobic treatment if desired. By using such a method, domains can be formed, each of which contact area to the insulating layer, S ($nm^2$), is controlled to be 10,000 or less.

A donor molecule or an acceptor molecule which can be readily transformed into amorphous is represented by the following formula:

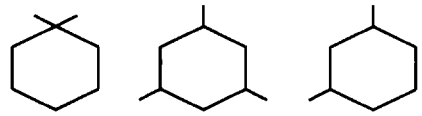

(wherein A represents an aromatic skeleton or an alicyclic skeleton, B represents a dye skeleton, a plurality of dye skeletons being able to be either the same or different, n represents an integer of 2 or larger, and X represents a coupling group which can be a single bond).

Examples of the aromatic skeleton or the alicyclic skeleton indicated by A in the above formula are those represented by Formulas (A-1) to (A-58) below, but the skeleton is not restricted to these examples.

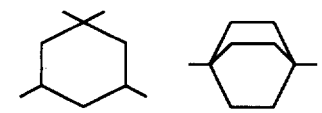

(A-1)  (A-2)  (A-3)

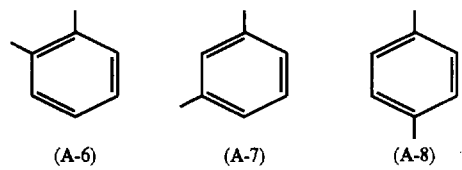

(A-4)  (A-5)

(A-6)  (A-7)  (A-8)

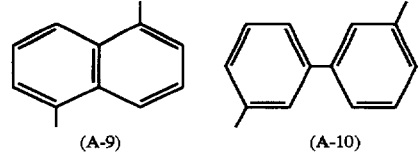

(A-9)  (A-10)

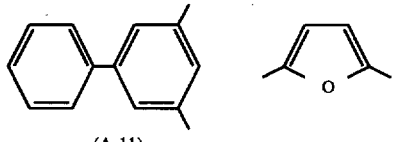

(A-11)  (A-12)

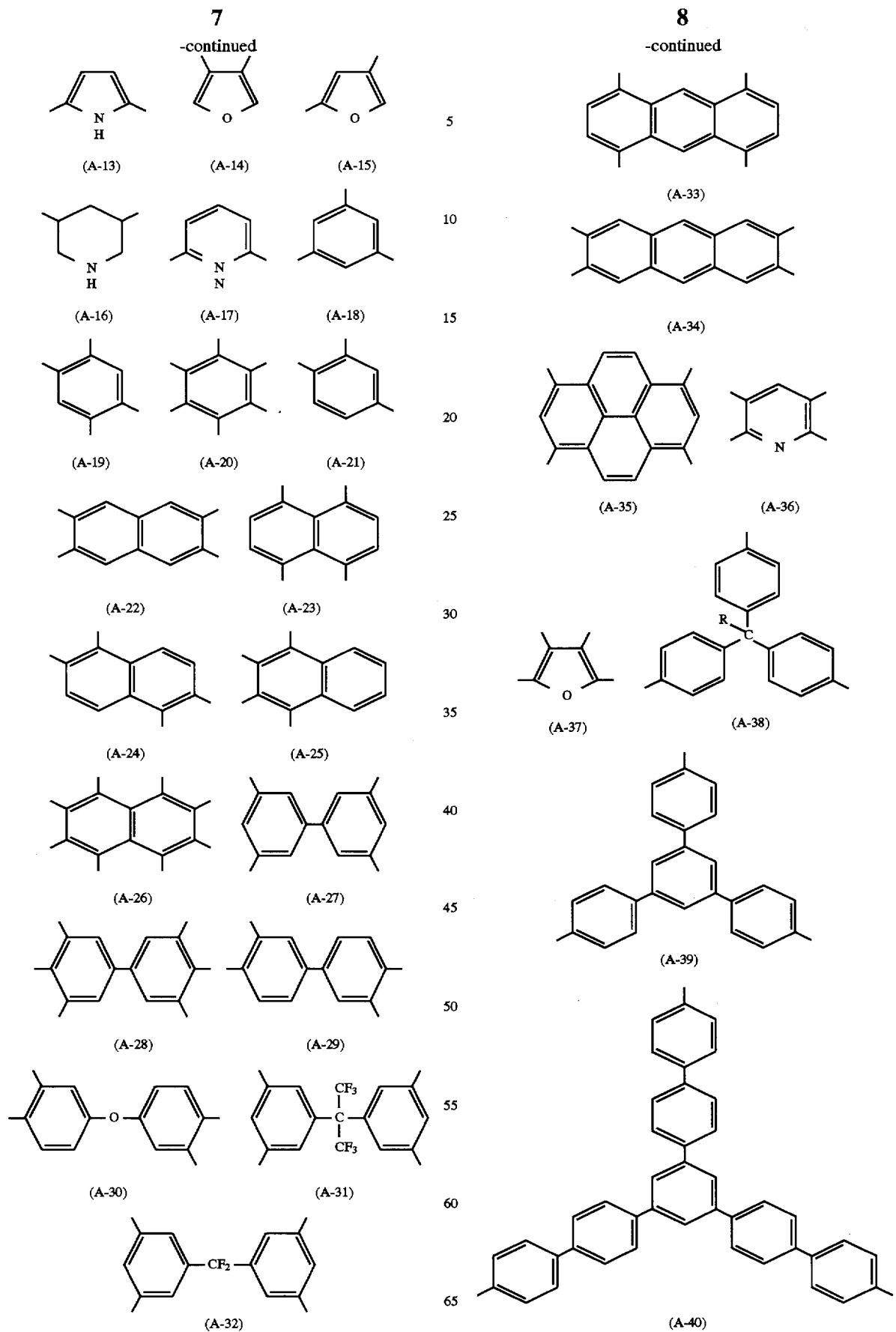

-continued

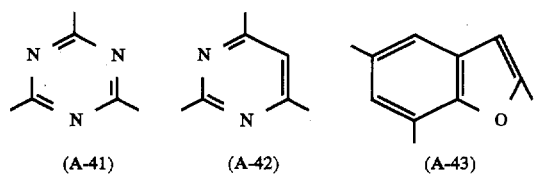
(A-41) (A-42) (A-43)

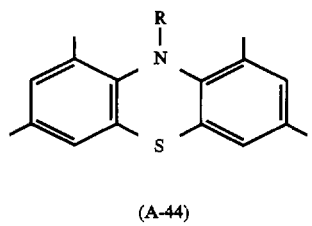
(A-44)

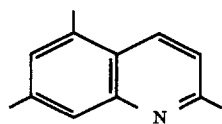
(A-45)

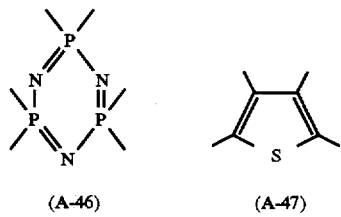
(A-46) (A-47)

wherein R represents a hydrogen atom or an alkyl group.

(A-48)
(A-49)
(A-50)
(A-51)
(A-52)
(A-53)

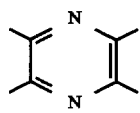

-continued

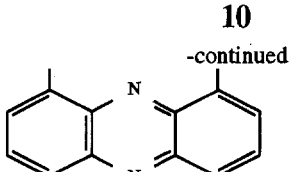
(A-54)

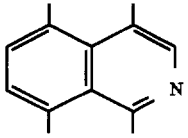
(A-55)

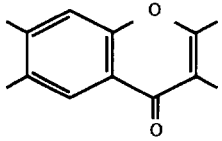
(A-56)

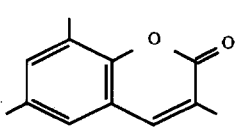
(A-57)

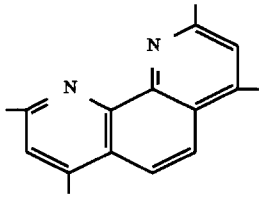
(A-58)

The dye skeletons represented by B in the above formula can be either the same or different, i.e., it is only necessary to properly chose them in accordance with the intended use. Although Formulas (B-1) to (B-79) below are examples of the dye skeletons, the dye skeletons are not limited to these examples.

Fulvalenes

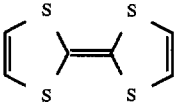
(B-1)

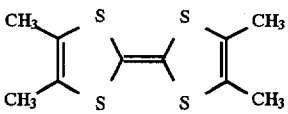
(B-2)

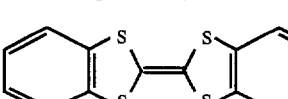
(B-3)

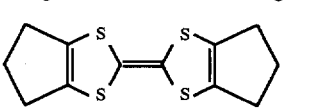
(B-4)

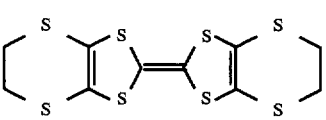
(B-5)

-continued
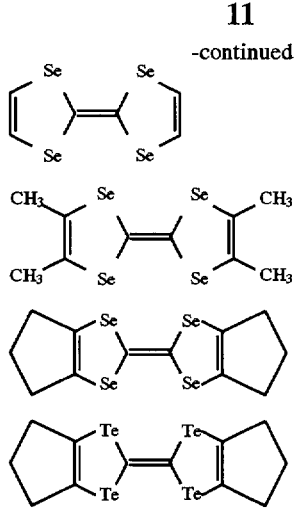
Sulfur-containing heterocyclic compounds
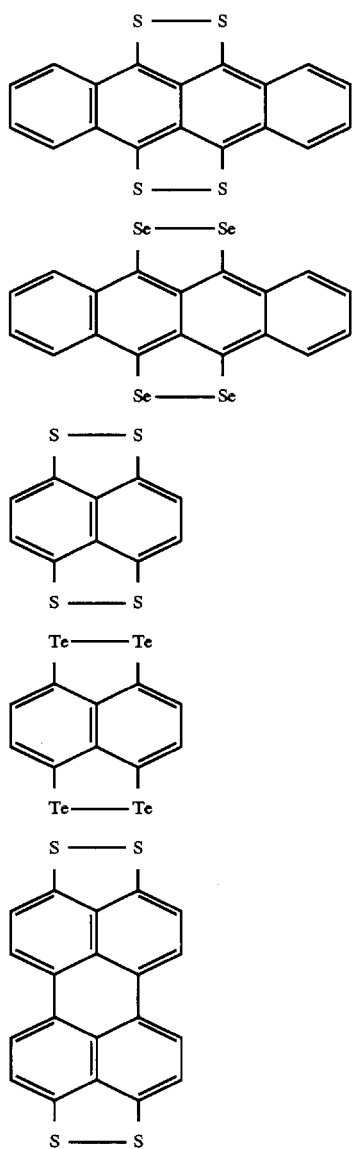
-continued
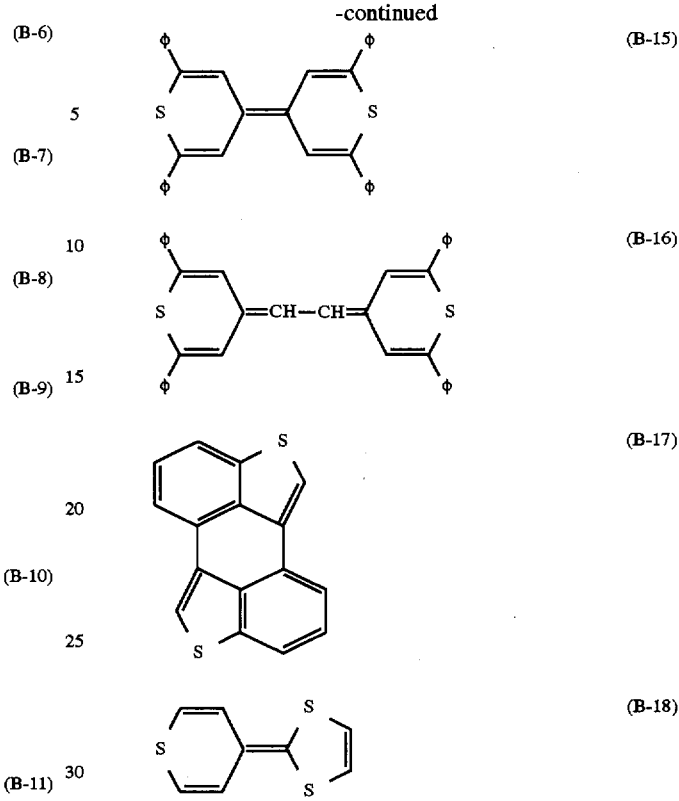
wherein φ represents an aryl group.
Aromatic amines
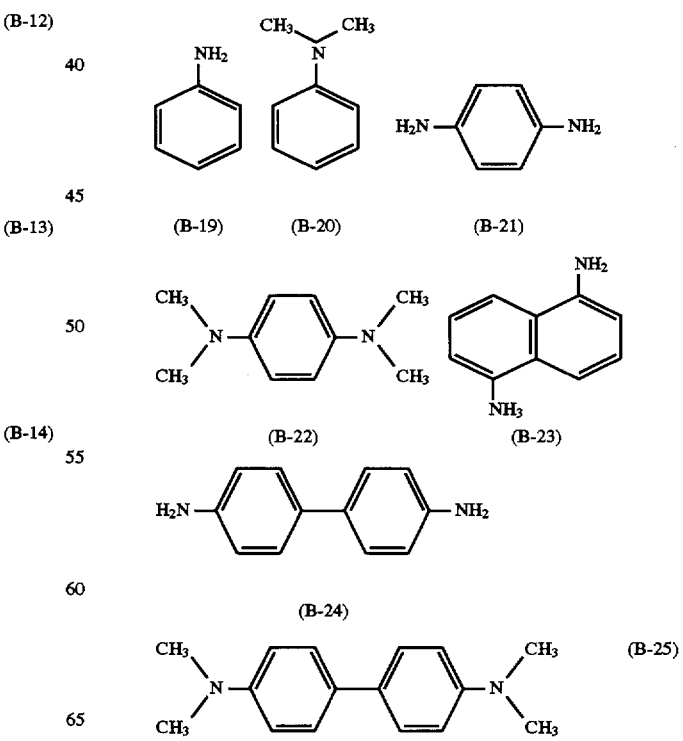

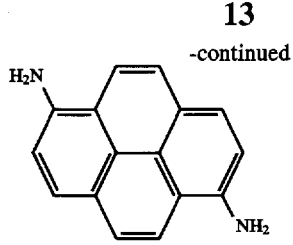
(B-26)
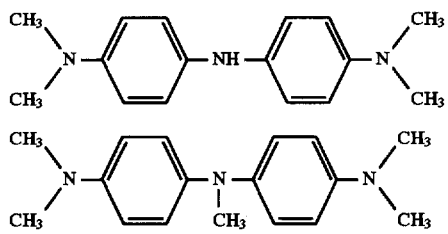
(B-27)
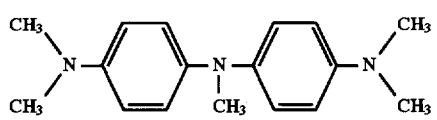
(B-28)
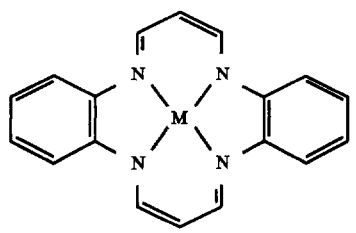
(B-29)  (B-30)
wherein R represents a hydrogen atom or an alkyl group.
Aromatic metal complex
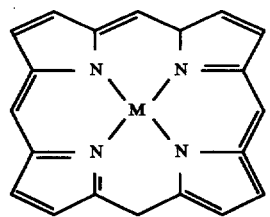
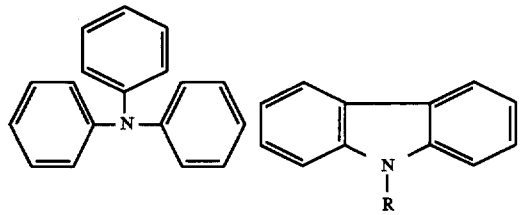
(B-31)  (B-32)
(B-33)
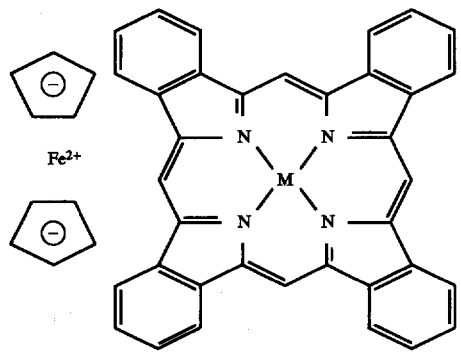
(B-34)
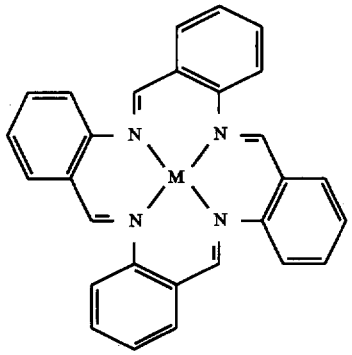
(B-35)
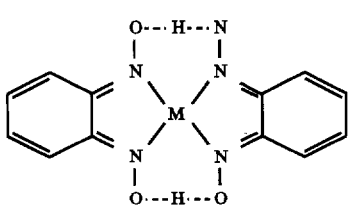
(B-36)
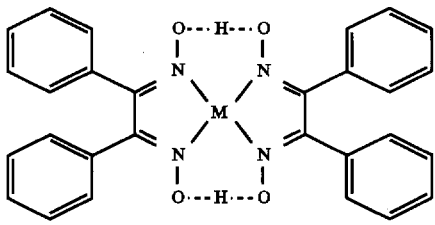
(B-37)
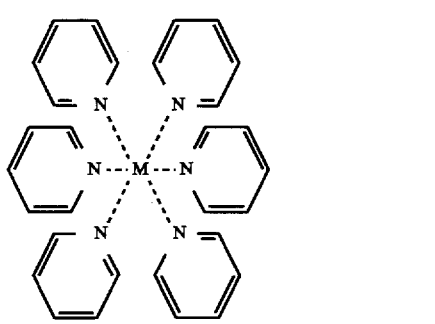
(B-38)
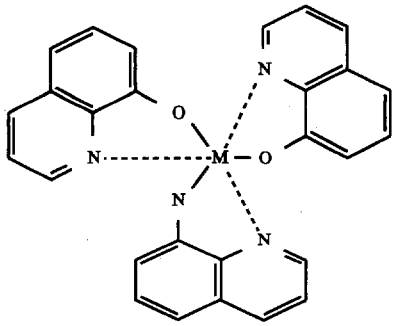
(B-39)
wherein M represents a metal ion capable of forming a complex.

Cyanin compounds
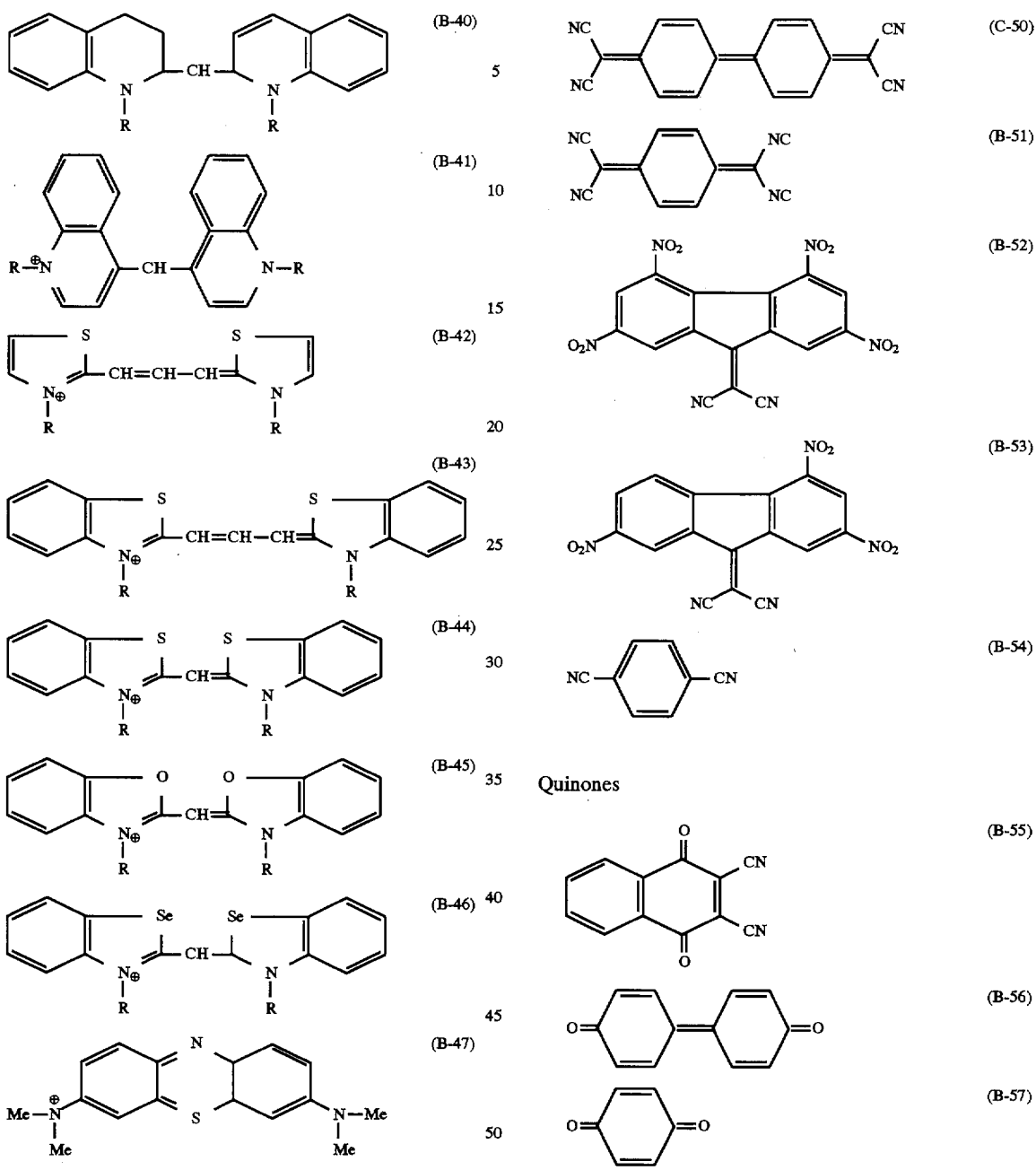
wherein Me represents a methyl group, and R represents an alkyl group.
Cyano compounds
Quinones
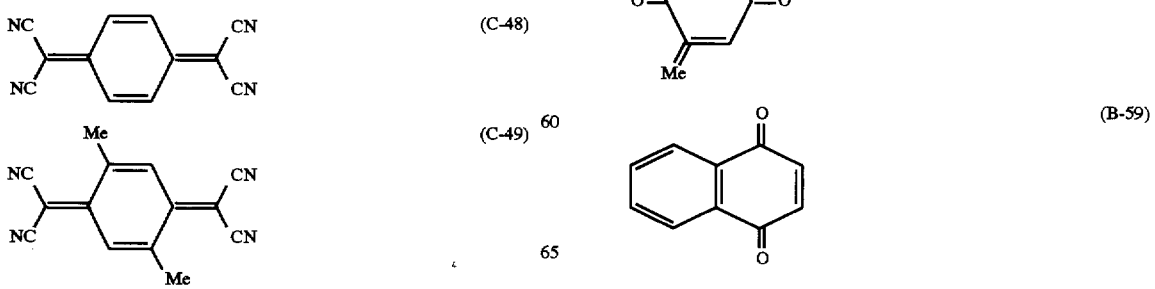

-continued

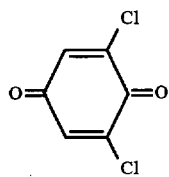 (B-60)

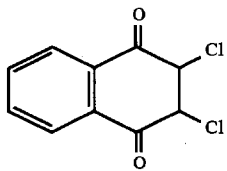 (B-61)

wherein Me represents a methyl group.

Nitro compounds

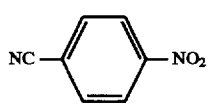 (B-62)

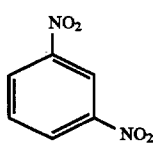 (B-63)

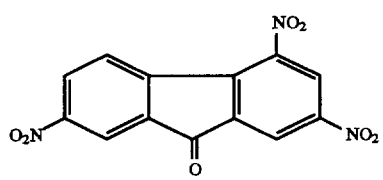 (B-64)

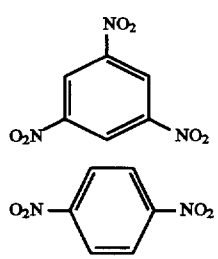 (B-65)

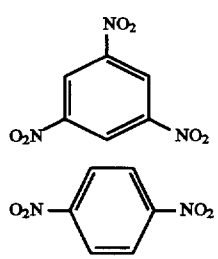 (B-66)

Heterocyclic compounds

 (B-67)

 (B-68)

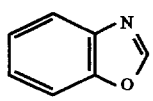 (B-69)

 (B-70)

 (B-71)

 (B-72)

Condensed polycyclic hydrocarbons

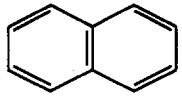 (B-73)

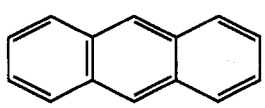 (B-74)

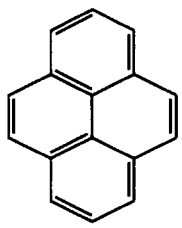 (B-75)

Others

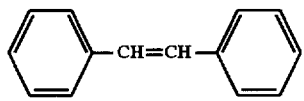 (B-76)

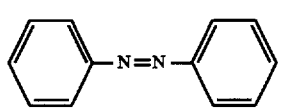 (B-77)

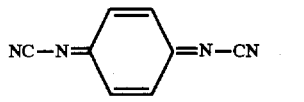 (B-78)

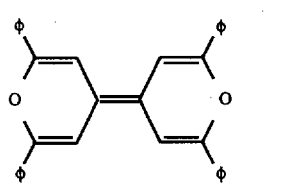 (B-79)

wherein φ represents an aryl group.

Note that these dye skeletons can be further substituted by an appropriate substituent. It is particularly preferable to introduce a substituent group capable of forming a hydrogen bond such as a hydroxyl group, a carboxyl group, an amide group, an amino group, a urethane group, or a urea group, since Tg rises to further stabilize the amorphous state in the domain structure.

Examples of the coupling group represented by X in the above formula are as follows.

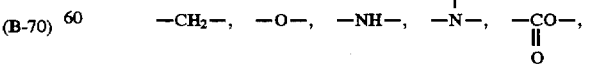

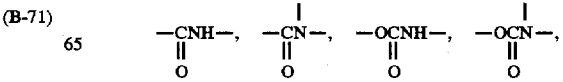

—S—, —N=N—, —CH=N—, —CH=CH—

Note that it is also that it is also possible to use a group IV semiconductor, a III–V compound semiconductor, a II–VI compound semiconductor, or a metal, as the material of the recording layer in the first recording medium of the present invention. However, if the recording layer is formed by a metal or a semiconductor, it is difficult to control the shape of the domain structure. Additionally, control of the polarity of carriers to be recorded also becomes difficult because both electrons and holes can be injected.

The principles of write, read, and erasure with respect to the first recording medium of the present invention and the conditions which the recording medium must satisfy in order to realize these operations with a high controllability will be described below.

A recording/reproduction method for the first recording medium includes the steps of preparing a probe capable of being applied with a voltage, bringing the probe applied with a voltage into contact with a predetermined domain constituting a recording layer of the recording medium to perform recording by injecting carriers into the domain, detecting the carriers injected into the domain by scanning the probe applied with a voltage in a state of noncontacting with the domain, and erasing the carriers injected into the domain by bringing the probe applied with a voltage having opposite polarity to the polarity during the recording into contact with the domain.

The probe is equivalent to one used in an STM or an AFM and has a structure in which, for example, a tip is formed at the end of a cantilever made from an insulator, and an electrode made from a conductor such as Cr or Au is formed on the surface of the cantilever main body on the tip side. The use of the probe with this structure makes it possible to exchange carriers with the individual domains constituting the recording layer at a higher controllability than in the case in which a conventional metal electrode is used.

In recording, the probe applied with a voltage is brought into contact with a predetermined domain constituting the recording layer, injecting carriers into the domain. Consequently, image carriers are induced in the underlying conductor layer to form a local capacitor. The capacitance, C (F), of this capacitor is represented by $$C = 8.8 \times 10^{-21} \times \epsilon S/d \quad (2)$$

where S ($nm^2$) is the area of the domain, i.e., the contact area between the domain and the insulating layer, $d$ (nm) is the thickness of the insulating layer present between the domain structure and the underlying conductor layer, and $\epsilon$ is the relative dielectric constant of the insulating layer. Let $n$ be the number of carriers injected. Then the electrostatic energy, $E_{e1}$ (eV), is represented by $$E_{e1} = 1.6 \times 10^{-19} \times n^2/2C \quad (3)$$

Accordingly, to set the recording condition in accordance with the number of carriers it is necessary that the difference of the electrostatic energy corresponding to the number of injected carriers be larger than the thermal energy. A necessary condition for this is represented by $$1.6 \times 10^{-19} \times 1/2C \geq 0.026 \quad (4)$$

Equation (4) above is the condition by which injection of carriers, or write, to a domain is done at room temperature and carriers are stably stored.

In reading, the probe applied with a DC or AC voltage is scanned as it is not in contact with the domain. Consequently, the carriers injected into the domain are detected as the magnitude of the electrostatic force acting between the probe and the domain. In this case it is important that the value of the electrostatic force corresponding to the number of carriers injected into the domain be so large as to be detectable. The magnitude, $F_{e1}$, of the electrostatic force is represented by $$F_{e1} = -A(V - Vs)^2 \quad (5)$$

where Vs (volts) is the domain surface potential, and V (volts) is the potential of the probe with respect to the underlying conductor layer. $A$ is a constant which depends upon the radius of curvature at the tip of the probe, the distance between the tip and the domain, the dielectric constant of the material constituting the recording layer with a domain structure, and the dielectric constant of the insulating layer. Also, in the domain into which carriers are injected, the surface potential shifts by $\Delta V$ (volts) which is represented by $$\Delta V = 1.6 \times 10^{-19} \times n/C \quad (6)$$

As is apparent from Equation (5), this shift of the surface potential changes the magnitude of the electrostatic force. This surface potential shift or the consequent change in the electrostatic force can be detected as follows. That is, the change in the electrostatic force can be directly detected by two-dimensionally scanning the probe such that the probe is slightly separated from the surface of the recording layer, while the probe potential is held constant. Suppose the probe is applied with an AC voltage with a frequency ω represented by the following equation:

$$V = V_0 + V_1 \sin \omega t \quad (7)$$

At that time the electrostatic force $F_{e1}$ is given by:

$$F_{e1} = -AV_1^2(1 - \cos 2\omega t)/2 - A(V_s + \Delta V - V_0)^2 + 2AV_1(V_s + \Delta V - V_0)\sin \omega t \quad (8)$$

Accordingly, the magnitude of the potential shift $\Delta V$ can be calculated by detecting the ω component by using a lock-in amplifier. Alternatively, it is possible to detect the ω component, apply a DC voltage $V_0$ with which the ω component is zero to the probe, and calculate the value of $\Delta V$ from the value of $V_0$. Note, in this case, that the resolution of the surface potential is considered to be about 0.4 mV (Yokoyama et al., Molecular Electronics and Bioelectronics, Vol. 3, No. 2, p. 79 (1992)), so even a very small change in the surface potential can be detected. Assuming the resolution is 1 mV, the condition by which a single electron or hole is detected as a carrier is represented by $$1.6 \times 10^{-19} \times 1/C \geq 0.001 \quad (9)$$

It is evident that if Equation (4) is satisfied, Equation (9) also is satisfied. Furthermore, substituting Equation (2) into Equation (4) yields Equation (1). That is, in the recording medium meeting the condition represented by Equation (1), a single electron or hole can be injected into a domain with a high controllability, and the single electron or hole thus injected into the domain can be easily detected. This makes it possible to perform multivalue recording by setting a recording condition corresponding to each different number of injected carriers.

When donor molecules are used as the material constituting the recording layer, only holes are injected, so the number of holes is used as the recording condition. On the other hand, when acceptor molecules are used, the number of electrons is used as the recording condition since only electrons are injected. Note that S ($nm^2$) is preferably set at 10,000 or less in order to increase the recording density of the recording layer.

The second recording medium of the present invention will be described below.

The second recording medium of the present invention includes an underlying conductor layer, an insulating layer formed on the underlying conductor layer, and a recording layer formed with a domain structure on the insulating layer and capable of storing carriers, wherein the recording layer contains a domain constituent material and an impurity whose molar ratio to the domain constituent material is 10% or less, and the highest occupied molecular orbital of the impurity is higher in energy than the highest occupied molecular orbital of the domain constituent element, or the lowest unoccupied molecular orbital of the impurity is lower in energy than the lowest unoccupied molecular orbital of the domain constituent material.

The underlying conductor layer and the insulating layer used in the second recording medium are analogous to those used in the first recording medium described previously.

The recording layer of the second recording medium contains a domain constituent material and an impurity added to this domain constituent material. This impurity consists of molecules, atoms, or clusters of atoms different from those of the domain constituent material. Note that the content of the impurity need only be 10% or less, as a molar ratio, of the domain constituent material. Also, it is only necessary to add a few molecules or atoms of the impurity to the domain constituent material. The content of the impurity is defined as above because, if the molar ratio of the impurity exceeds 10%, the orbital of the impurity and the orbital of the domain constituent material may be hybridized to make formation of an isolated impurity level impossible.

The conditions required of the domain constituent material are that the domain constituent material can form a domain structure and has an electron level close to the work function of the electrode material on the surface of a probe. The energy level of the impurity added to the domain constituent material of this sort is required to meet one of the two conditions. One is (i) the highest occupied molecular orbital (HOMO) of the impurity is higher in energy than the HOMO of the domain constituent material. When this condition is expressed using ionization potential Ip, Ip (impurity)<Ip (domain constituent material). This condition means that the impurity is a stronger donor molecule and accepts holes more easily than does the domain constituent material. The other is (ii) the lowest unoccupied molecular orbital (LUMO) of the impurity is lower in energy than the LUMO of the domain constituent material. $E_A$ (impurity) >$E_A$ (domain constituent material) when this condition is expressed using electron affinity $E_A$. This condition means that the impurity is a stronger acceptor molecule and accepts electrons more easily than does the domain constituent material.

When an impurity meeting the above energy condition is added to the domain constituent material, the injected carriers are necessarily trapped in the impurity. If no such impurity is added, the injected carriers are merely spatially confined in a domain; that is, scattering to another domain takes place at a certain probability due to some influence such as surface conduction. This results in low recording stability. In contrast, in the structure in which the injected carriers are trapped in the impurity in a domain as in this second recording medium, the injected carriers are not only spatially confined but also confined in terms of energy in the level surrounded by the potential barriers. This greatly improves the recording stability.

It is preferable that the impurity contained in a domain emits fluorescence, and that the line width of this fluorescence be small so that the fluorescence can be detected down to a single molecular level. On the other hand, it is desirable that the domain constituent material does not emit fluorescence, or that the excitation wavelength or the fluorescence wavelength of the material substantially does not overlap the excitation wavelength or the fluorescence wavelength of the impurity.

From the above viewpoints, a suitable material of the domain constituent material is, e.g., an organic molecule having a strong donor or acceptor property, and an example of the impurity added to this domain constituent material is an organic molecule having a stronger donor or acceptor property than that of the domain constituent material. Note that the ionization potential Ip of the donor molecule in the form of a solid crystal or a thin film is preferably 8 eV or less. Note also that the electron affinity $E_A$ of the acceptor molecule in the form of a solid crystal or a thin film is preferably 1 eV or more.

Methods similar to those explained previously in conjunction with the first recording medium can be used as the method of forming the recording layer with a domain structure by using the domain constituent material and the impurity consisting of organic molecules as described above.

In the second recording medium of the present invention, a group IV semiconductor, a III-V compound semiconductor, or a II-VI compound semiconductor can be used as a suitable material of the domain constituent material, in addition to the organic molecules described above. As the impurity added to any of these semiconductors, it is desirable to use a transition metal or a rare earth element, particularly a transition metal or a rare earth element whose fluorescence quantum efficiency is high. Various solid laser media such as ruby or Nd:YAG also can be used as the combination of impurity and the domain constituent material. Note, however, that injection of carriers is rather difficult when the solid laser medium is used, although the impurity has excellent fluorescence characteristics. Therefore, when the solid laser medium is used it is desirable to inject carriers by emitting an electron beam from a field emission type electron gun or microemitter.

To form a recording layer with a domain structure by using these inorganic materials, it is possible to use a method in which a thin film is patterned using a resist after being formed, a method in which a thin film is processed with an electron beam or an ion beam after being formed, or a method in which in the thin film formation process the thin film growth is stopped in a region with a small film thickness where no two-dimensional film is formed.

In the second recording medium of the present invention, as in the first recording medium described earlier, in order to control the number of carriers injected to a domain down to a single carrier it is desirable that the relation $d/(S\epsilon) \geq 2.86 \times 10^{-3}$ be satisfied where $\underline{d}$ (nm) is the thickness of the insulating layer, $\epsilon$ is the relative dielectric constant of the insulating layer, and S ($nm^2$) is the contact area between each domain constituting the recording layer and the insulating layer.

The principles of write, read, and erasure with respect to the second recording medium of the present invention will be described below by taking the case in which both the domain constituent material and the impurity consist of organic molecules as an example.

A recording/reproduction method for the second recording medium includes the steps of preparing a probe capable of being applied with a voltage and capable of detecting fluorescence, bringing the probe applied with a voltage into contact with a predetermined domain constituting a recording layer of the recording medium to perform recording by injecting carriers into the domain, scanning the probe and detecting fluorescence emitted from an impurity in the domain upon irradiation of exciting light and having a correlation with the carriers stored in the domain, and erasing the carriers injected into the domain by bringing the probe applied with a voltage having opposite polarity to the polarity during the recording into contact with the domain.

The probe used in this method desirably has a function equivalent to that of a probe used in an STM or an AFM in order to exchange carriers with individual domains constituting the recording layer, and has a function equivalent to that of a probe used in an NSOM (Near-field Scanning Optical Microscope) in order to detect the fluorescence emitted from the impurity in each domain. From this point of view, it is desirable to use a probe for an SNOAM (Scanning Near-field Optical and Atomic-force Microscope), which has the functions of both the types of probes. An example of this probe is a structure formed by processing an optical fiber into an L shape so that fluorescence can be detected, and forming an electrode made from Cr or Au on the surface of the tip of this optical fiber in order to enable exchange of carriers with domains.

Recording in the second recording medium is performed by bringing the probe applied with a voltage into contact with a predetermined domain constituting the recording layer, and injecting carriers into the domain. In this case the number of carriers injected into the domain is set as the recording condition. This probe has a function equivalent to that of the probe electrode represented by an STM or an AFM described above and hence can inject carriers into individual domains with a high controllability.

Read of recorded data from the second recording medium is done by detecting fluorescence emitted from the impurity in the domain. As in the case of the first recording medium, it is also possible to evaluate the magnitude of the electrostatic force by scanning the probe electrode applied with a DC or AC voltage so that the probe is not in contact with the domain structure. Unfortunately, in a method by which a DC voltage is applied to the probe and the resulting change in the magnitude of the electrostatic force is two-dimensionally mapped, it may become impossible to read out the recorded data if the distance between the probe and the sample is a few nm or smaller, since the probe and the sample contact each other. If the distance between the probe and the sample is set to between ten nm to a few tens of nm, the probe suffers from the electrostatic force of the surrounding domains, and this increases the detection error of the surface potential. On the other hand, in a method by which an AC voltage with a frequency $\omega$ is applied to the probe, and the $\omega$ component of the force is detected as an output signal while the voltage applied to the piezoelectric device in the z direction is so controlled that the $2\omega$ component of the force is held constant, the distance between the probe and the sample can be kept very short, 10 nm or smaller, improving the measurement accuracy of the surface potential. In this method, however, the $\omega$ component and the $2\omega$ component of the force must be detected by a lock-in method, and this results in a low read rate. In contrast, a reproduction method for the second recording medium is characterized by detecting a change in the optical properties with a change in the number of carriers by using the probe. As will be described later, therefore, the method has a high read rate, a high accuracy, and a high S/N ratio.

Erasure of recorded data from the second recording medium is accomplished by bringing the probe, which is applied with a voltage of opposite polarity to that in the recording, into contact with a predetermined domain.

The method of reading out recorded data by detecting a change in the optical properties with a change in the number of carriers injected into a domain will be described in more detail below. Assume that the number of carriers injected into a domain is $N_{inj}$, the number of molecules of the impurity in the domain is N$imp$, and these values satisfy a relation $N_{inj} < N_{imp}$. Since the ionization potential or the electron affinity of the domain constituent material and the impurity molecules meets the condition (i) or (ii) described previously, all carriers injected into the domain are trapped by the impurity molecules. As a result, the charged states of the impurity molecules are such that $N_{inj}$ molecules are in the ionized state and $(N_{imp} - N_{inj})$ molecules are in the neutral state. Generally, the fluorescence spectra of the impurity molecules in the neutral state and the ionized state are entirely different, so the peak wavelengths in the two states are extremely separated from each other. Additionally, the fluorescence intensities at the peaks in the neutral state and the ionized state are directly proportional to $N_{inj}$ and $(N_{imp} - N_{inj})$, respectively.

Two methods are practically possible as the method of detecting fluorescence emitted from individual domains on the basis of the above principle. One is a method by which exciting light is irradiated onto the entire substrate and the fluorescence emitted from each domain is detected by two-dimensionally scanning a fiber probe having a function equivalent to that of a near-field scanning optical microscope (NSOM). In this method it is possible to use a high-pressure xenon discharge tube, a mercury lamp, a tungsten lamp, a super-high-pressure mercury discharge tube, or a dye laser, as the exciting light source. Also, it is desirable to set an optical filter for cutting off the exciting light in front or back of the sample. Especially when ultraviolet radiation is used as the exciting light, the use of an ultraviolet cutting filter is essential. The second method, on the other hand, is to irradiate exciting light from a fiber probe onto individual domains and detect the emitted fluorescence by using some other detector.

When either of the above methods is used, a very rapid read operation is possible. That is, when the fiber probe is used in the fluorescence detection in the first method, fluorescence emitted from a domain immediately below the probe can be detected at a high sensitivity even if the probe is located at a distance of ten to several tens of nm from the sample. There is an additional advantage that fluorescence emitted from the surrounding domains hardly enters the fiber probe. Consequently, in the fluorescence detection it is possible to use the method of detecting fluorescence from each domain by applying a DC voltage to the probe and two-dimensionally scanning the probe, rather than the method in which an AC voltage is applied to the probe. This enables a high-speed read operation. Also, when the fiber probe is used in domain excitation in the second method, only a domain immediately below the probe can be excited even if the probe is separated a certain distance from the sample. Consequently, a considerably rapid read action is possible.

The fact that a high S/N ratio can be attained when domains serving as the recording layer are formed by using the domain constituent material and the impurity and fluorescence from the impurity is used as a change amount corresponding to the number of carriers will be qualitatively explained below. Consider a change in the fluorescence characteristics assuming that one domain is constituted by $N_d$ fluorescent dye molecules (the domain constituent material). When $N_{inj}$ carriers are injected into this domain, the ratio of the change in the fluorescence spectrum is $N_{inj}/N_d$. On the other hand, when $N_{imp}$ impurity molecules are added to the $N_d$ domain constituent material molecules as in the second recording medium, the ratio of the change in the fluorescence spectrum caused by injection of the $N_{inj}$ carriers is $N_{inj}/N_{imp}$. Since the relation $N_d \gg N_{imp}$ holds in the second recording medium, the change ratio of the fluorescence spectrum is large, and this greatly improves the S/N ratio.

EXAMPLES

The present invention will be described in more detail below by way of its examples with reference to the accompanying drawings.

Example 1

FIG. 1 is a sectional view of a recording medium 10 manufactured in this example. On the surface of a p-type Si substrate Ω having a resistivity of 1Ω.cm, serving as an underlying conductor layer, an insulating layer consisting of a 20-nm thick $SiO_2$ film 2 is formed by thermal oxidation. After the $SiO_2$ film on the lower surface of the substrate is removed, a 2.5-nm thick Cr layer and a 50-nm thick Au layer are sequentially formed on the lower surface of the substrate, forming a backing electrode 3. A heat treatment is then performed, and the resultant structure is left to stand under an atmosphere containing hexamethyldisilazane saturated vapor for about three days. Consequently, the $SiO_2$ film 2 on the substrate surface is made hydrophobic.

Subsequently, 1,1-bis(N,N-ditolylaminophenyl)cyclohexane (to be referred to as diamine hereinafter), as a donor molecule, is evaporated on the $SiO_2$ film 2 on the surface of the Si substrate 1 formed as described above, thereby forming a recording layer 4 having a domain structure. The molecular structure of the diamine is presented below. The evaporation conditions are that the degree of vacuum is $1.3 \times 10^{-4}$ Pa, the substrate temperature is 20° C., and the Knudsen cell heating temperature is 180° C. The deposition rate of the diamine is monitored using a quartz oscillator arranged near the Si substrate and found to be 0.02 nm/sec. In this example, a diamine layer corresponding to a thickness of 1.0 nm is formed by setting the evaporation time to approximately 50 sec. The structure of the diamine recording layer 4 is observed with an SEM, and it is confirmed that droplet domains 32 nm in diameter and 7 nm in height are present at a density of $2.4 \times 10^{14}$ m$^{-2}$. Since the relative dielectric constant, ε, of $SiO_2$ is 3.9, the value of d/(Sε) of the resultant recording medium is $6.38 \times 10^{-3}$.

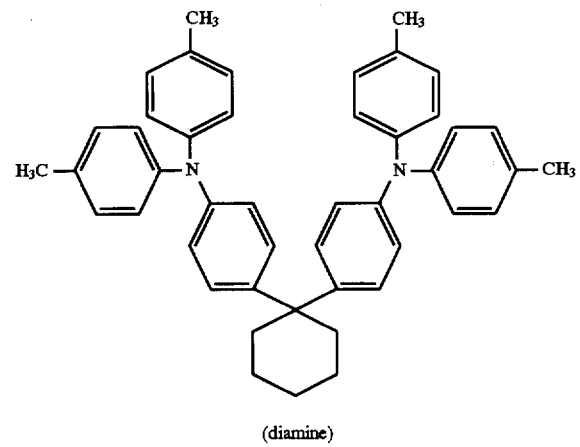

(diamine)

Meanwhile, an AFM probe is prepared by forming an electrode 31 by sequentially evaporating a 2-nm thick Cr layer and a 20-nm thick Au layer on the surface on the tip side of an SiN cantilever main body 30 having a spring constant of 0.58 N/m. The radius of curvature of the tip at the point of this cantilever is 10 nm.

Figure 2:
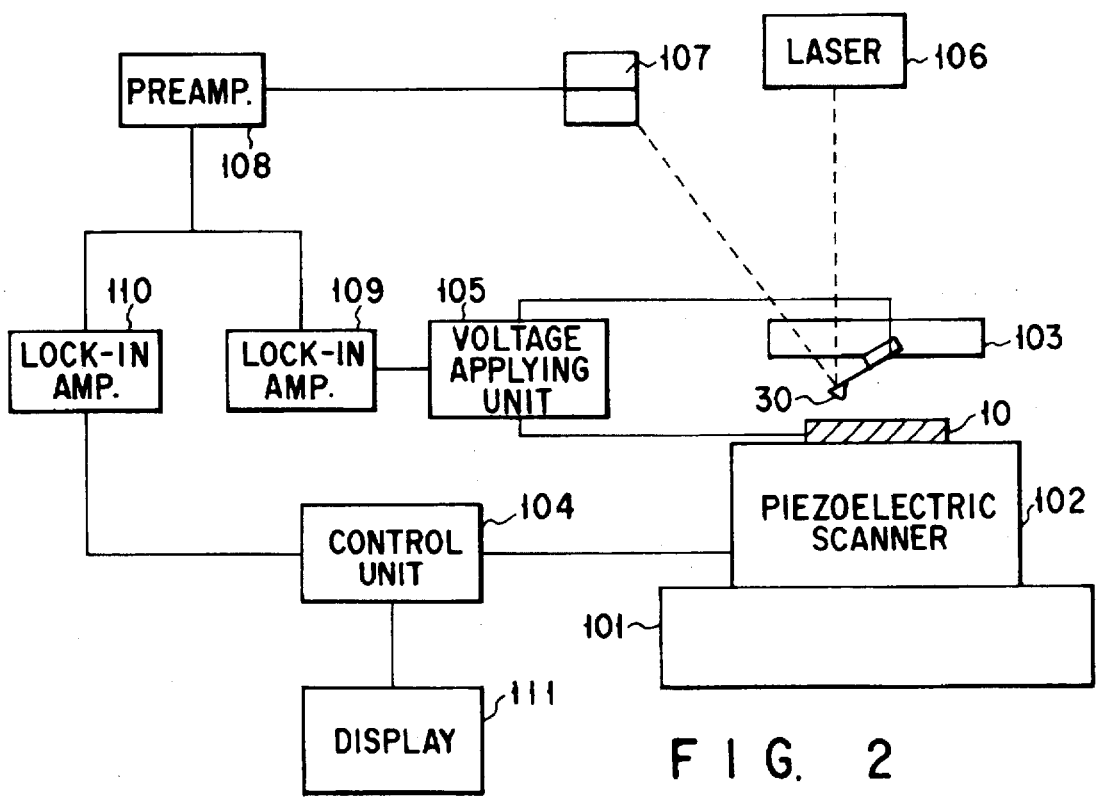
FIG. 2 is a block diagram of a recording/reproduction system for the recording medium of Example 1.

FIG. 2 is a block diagram of a recording/reproduction system for the recording medium of this example. The recording medium 10 is placed on a piezoelectric scanner 102 on a coarse adjustment mechanism 101. The cantilever 30 is mounted on a cantilever mount 103 above the piezoelectric scanner 102. The operation of the piezoelectric scanner 102 is controlled by a control unit 104. A voltage produced by superposing an AC voltage of a frequency ω on a DC voltage from a voltage applying unit 105 is applied between the recording medium 10 and the cantilever 30. Light is emitted from a semiconductor laser 106 onto the back side of the cantilever 30, and the reflected light is detected by a photodiode 107. A signal from the photodiode is amplified by a preamplifier 108. The ω component of this signal is detected by a lock-in amplifier 109, and the lock-in amplifier 109 performs feedback control for the voltage of the voltage applying unit 105 so that the ω component becomes zero. Also, this signal is displayed on a display 111 via a lock-in amplifier 110 and the control unit 104.

Figure 3:
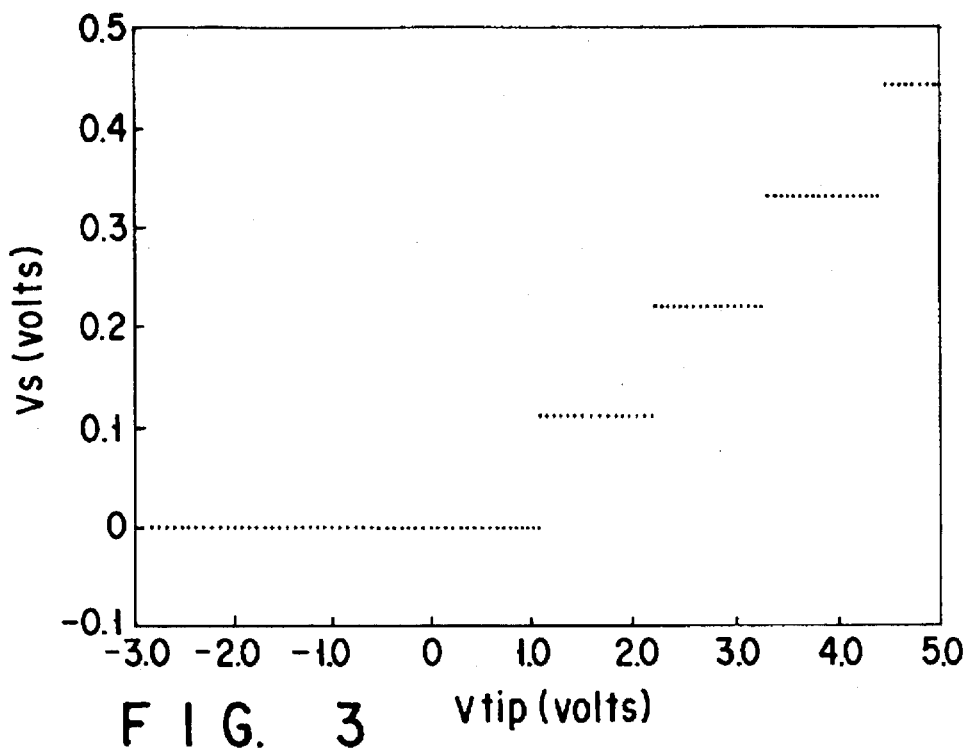
FIG. 3 is a graph showing the relationship between the tip potential of a cantilever during recording and the domain surface potential during reproduction for the recording medium of Example 1.
Figure 4:
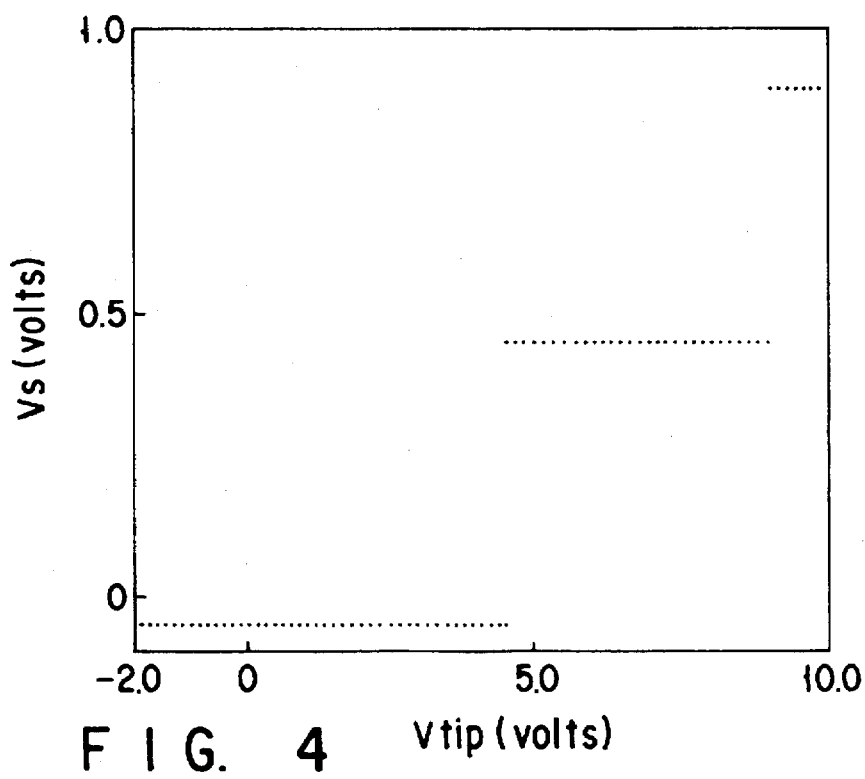
FIG. 4 is a graph showing the relationship between the tip potential and the domain surface potential for a recording medium of Example 2.

Write and read operations are performed for this recording medium as follows. That is, while a voltage $V_{tip}$ is applied to the tip through the electrode 31, the tip is brought into contact with a diamine domain constituting the recording layer for about one second, thereby injecting carriers from the tip into the domain, performing a write action. The tip and the domain are then separated from each other. Thereafter, an AC voltage is applied to the probe with the distance between the tip and the diamine domain kept at approximately 10 nm, and the surface potential is evaluated from the voltage dependence of the electrostatic force, thereby performing a read action. The above operation is repetitively performed while the value of $V_{tip}$ is gradually raised from 0 V. FIG. 3 shows the relationships between the tip potential $V_{tip}$ during recording and the domain surface potential $V_s$ during reproduction for the same domain.

As is apparent from FIG. 3, $V_s$ shows stepwise changes in regions in which the polarity of $V_{tip}$ is positive. That is, $V_s$ is 0 V when $V_{tip}$ ranges between 0 and 1.1 V, and discontinuously increases to 0.11 V when $v_{tip}$ is 1.1 V. Thereafter, $V_s$ remains unchanged at 0.11 V when $V_{tip}$ ranges from 1.1 to 2.2 V, and again discontinuously increases by 0.11 V to become 0.22 V when $V_{tip}$ is 2.2 V. In this manner, whenever $V_{tip}$ changes by +1.1 V the discontinuous increase and the plateau of $V_s$ periodically appear. Note that no surface potential change is found in a region in which the polarity of $V_{tip}$ is negative. It is evident from Equation (6) that the Jump ($\Delta V$), +0.11 V, of $V_s$ corresponds to the change of one carrier (in this case a hole because $\Delta V$ is positive), so the change in the surface potential caused by injection of one hole into the domain is detected.

Example 2

Following almost the same procedure as in Example 1, a diamine layer corresponding to a thickness of 0.5 nm is formed by setting the evaporation time to 25 sec. The structure of this diamine recording layer is observed with an SEM, and it is confirmed that droplet domains 16 nm in diameter and 4 nm in height are present at a density of $3.5 \times 10^{14}$ m$^{-2}$. The value of d/(Sε) of the resultant recording medium is $2.55 \times 10^{-2}$.

Comparative Example

Following almost the same procedure as in Example 1, a diamine layer corresponding to a thickness of 20 nm is formed by setting the evaporation time to 1000 sec. The structure of this diamine recording layer is observed with an SEM, and it is confirmed that droplet domains 220 nm in diameter and 75 nm in height are present at a density of $1.2 \times 10^{13}$ m$^{-2}$. The value of d/(Sε) of the resultant recording medium is $1.35 \times 10^{-4}$.

Write and read operations are performed for the recording medium following the same procedure as in Example 1. FIG. 5 shows the relationship between the tip potential $V_{tip}$ during recording and the domain surface potential $V_s$ during reproduction. As in FIG. 5, the surface potential $V_s$ continuously changes with $V_{tip}$, i.e., shows no stepwise change. When the value of d/(Sε) is small as in this case, no change in the surface potential corresponding to injection of one hole into a domain can be detected.

Example 3

A recording medium having the same structure as in FIG. 1 is manufactured by using DNIBPC (the structure is presented later), an acceptor molecule, as the material of a recording layer. Following the same procedure as in Example 1, an SiO$_2$ film 2 is formed on the upper surface of an Si substrate 1, a backing electrode 3 is formed on the lower surface of the substrate, and the SiO$_2$ film 2 is made hydrophobic. Subsequently, the DNIBPC is evaporated on the SiO$_2$ film 2 on the surface of the Si substrate 1 to form a recording layer 4 having a domain structure. The evaporation conditions are that the degree of vacuum is $1.3 \times 10^{-4}$ Pa, the substrate temperature is 20° C., and the Knudsen cell heating temperature is 220° C. The deposition rate of the DNIBPC is monitored using a quartz oscillator arranged near the Si substrate and found to be 0.02 nm/sec.

In this example, a DNIBPC layer corresponding to a thickness of 2.5 nm is formed by setting the evaporation time to approximately 125 sec. The structure of the DNIBPC recording layer 4 is observed with an SEM, and it is confirmed that droplet domains 40 nm in diameter and 10 nm in height are present at a density of $2.0 \times 10^{14}$ m$^{-2}$. The value of d/(Sε) of the resultant recording medium is $4.07 \times 10^{-3}$.

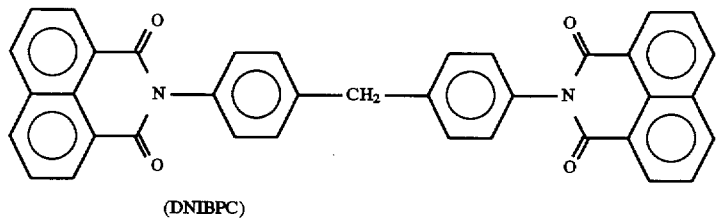

(DNIBPC)

Write and read operations are performed for this recording medium following the same procedure as in Example 1. FIG. 6 shows the relationship between the tip potential $V_{tip}$ during recording and the domain surface potential $V_s$ during reproduction. In contrast to Example 1, the surface potential $V_s$ shows a stepwise change in a region in which the polarity of $V_{tip}$ is negative. That is, $V_s$ is 0 V when $V_{tip}$ ranges between 0 and $-0.72$ V, and discontinuously decreases to $-72$ mV when $V_{tip}$ is $-0.72$ V. Thereafter, $V_s$ remains unchanged at $-72$ mV when $V_{tip}$ ranges from $-0.72$ to $-1.44$ V, and again discontinuously changes by $-72$ mV to become $-144$ mV when $V_{tip}$ is $-1.44$ V. In this manner, whenever $V_{tip}$ changes by $-0.72$ V the discontinuous decrease and the plateau of $V_s$ periodically appear. Note that no surface potential change is found in a region in which the polarity of $V_{tip}$ is positive. It is evident from Equation (6) that the value $-72$ mV of $\Delta V$ corresponds to the change of one carrier (in this case an electron because $\Delta V$ is negative), so the change in the surface potential caused by injection of one election into the domain is detected.

Example 4

FIG. 7 is a sectional view of a recording medium 20 manufactured in this example. On the surface of a p-type Si substrate 1 having a resistivity of 1 Ω.cm, serving as an underlying conductor layer, an insulating layer consisting of a 20-nm thick SiO$_2$ film 2 is formed by thermal oxidation. After the SiO$_2$ film on the lower surface of the substrate is removed, a 2.5-nm thick Cr layer and a 50-nm thick Au layer are sequentially evaporated on the lower surface of the substrate, forming a backing electrode 3. A heat treatment is then performed, and the resultant structure is left to stand under an atmosphere containing hexamethyldisilazane saturated vapor for about three days. Consequently, the SiO$_2$ film 2 on the substrate surface is made hydrophobic.

Subsequently, diamine as a domain constituent material 5 and tetrakis(N,N-diphenyl-4-aminophenyl)ethylene (to be referred to as S-150 hereinafter) as an impurity 6 are evaporated on the $SiO_2$ film 2 on the surface of the Si substrate 1 formed as described above, thereby forming a recording layer 4 having a domain structure. The structure of the S-150 is presented below. Although both the diamine and the S-150 are donor molecules, the donor property of the S-150 is stronger than that of the diamine. The evaporation conditions are that the degree of vacuum is $1.3 \times 10^{-4}$ Pa, the substrate temperature is 20° C., and the flow rate of the diamine to the S-150 is set at 3000 : 1 by adjusting the Knudsen cell heating temperatures of the diamine and the S-150. The deposition rate of the diamine is monitored using a quartz oscillator arranged near the Si substrate and found to be 0.02 nm/sec. In this example, the recording layer 4 corresponding to a thickness of 1.0 nm is formed by setting the evaporation time to approximately 50 sec. The structure of the recording layer 4 is observed with an SEM, and it is confirmed that droplet domains 32 nm in diameter and 7 nm in height are present at a density of $2.4 \times 10^{14}$ $m^{-2}$. The number of S-150 molecules present as an impurity in each domain is 5 on the average. Since the relative dielectric constant, $\epsilon$, of $SiO_2$ is 3.9, the value of $d/(S\epsilon)$ of the resultant recording medium is $6.38 \times 10-3$.

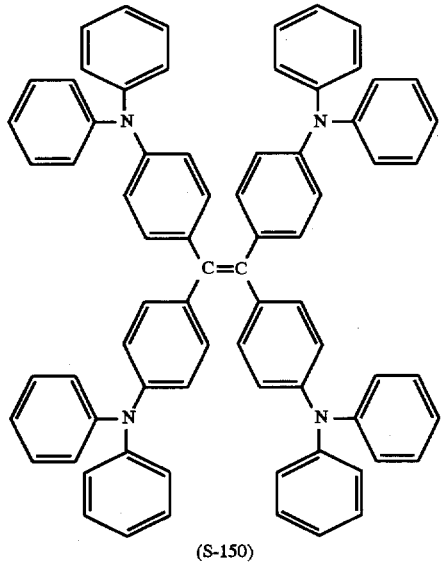

(S-150)

Meanwhile, a cantilever for an SNOAM (Scanning Near-field Optical and Atomic-force Microscope), which can perform both force measurement and fluorescence detection, is used as a probe. As illustrated in FIG. 7, this cantilever has a cantilever main body 40 made of an optical fiber whose end portion is bent into an L shape to form a tip. On the entire surface including the end portion of the cantilever main body 40, a 2-nm thick Cr layer and a 20-nm thick Au layer are sequentially evaporated to form an electrode 41.

FIG. 8 is a block diagram of a recording/reproduction system for this recording medium. Note that the recording system for this recording medium is similar to that in FIG. 2, and a detailed description thereof will be omitted. Fluorescence emitted from the sample upon irradiation of exciting light is detected by a photo-detecting unit 120 and displayed on a display 111.

While a voltage $V_{tip}$ is applied to the tip through the electrode 41, the tip is brought into contact with a domain constituting the recording layer of this recording medium for about one second, thereby injecting carriers from the tip into the domain, performing a write action. The tip and the domain are then separated from each other. After carriers are injected into one domain in this way, the surface potential $V_s$ and the fluorescence spectrum are measured by the following procedure. That is, an AC voltage is applied to the probe with the distance between the tip and the domain kept at approximately 5 nm, and the voltage dependence of the electrostatic force is measured. The surface potential is evaluated from the value of the tip potential at which the electrostatic attraction observed is a minimum, and the number of carriers injected into the domain is calculated. Subsequently, with the tip held at the same position, ultraviolet radiation is emitted from a mercury lamp onto the entire surface of the substrate. Fluorescence emitted from the domain into which carriers are injected is taken in from the opening portion at the end of the cantilever, and the fluorescence spectrum is evaluated using a spectroscope. In this example, the value of $V_{tip}$ is gradually increased from 0 V, and for each increase the tip is brought into contact with the domain and the evaluation of the surface potential and the evaluation of the fluorescence spectrum are repeatedly performed.

Figure 9:
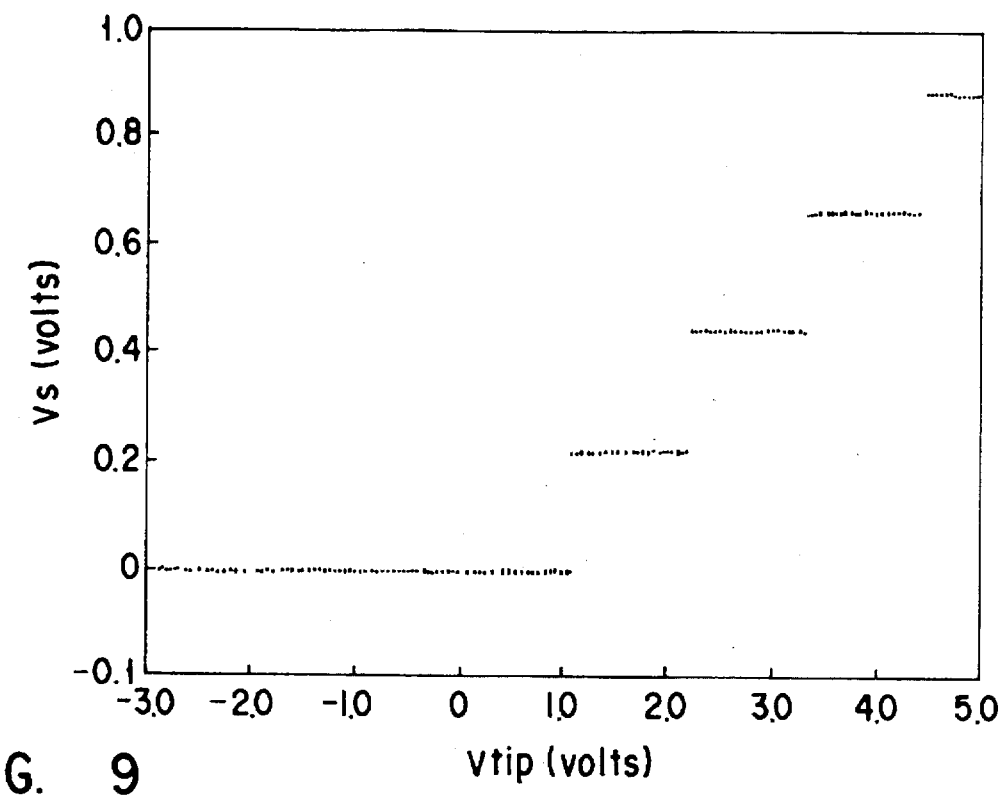
FIG. 9 is a graph showing the relationship between the tip potential and the domain surface potential for the recording medium of Example 4.

FIG. 9 shows the relationship between the tip potential $V_{tip}$ during recording and the domain surface potential $V_s$ during reproduction for the same domain. As is apparent from FIG. 9, $V_s$ shows a stepwise change in a region in which the polarity of $V_{tip}$ is positive. That is, $V_s$ is 0 V when $V_{tip}$ ranges between 0 and 1.1 V, and discontinuously increases to 0.22 V when $V_{tip}$ is 1.1 V. Thereafter, $V_s$ remains unchanged at 0.22 V when $V_{tip}$ ranges from 1.1 to 2.2 V, and again discontinuously increases by 0.22 V to become 0.44 V when $V_{tip}$ is 2.2 V. In this manner, whenever $V_{tip}$ changes by +1.1 V the discontinuous increase and the plateau of $V_s$ periodically appear. It is obvious from the polarity of the voltage that the carriers injected into the domain are holes. Note that no surface potential change is found when a similar measurement is done by changing $V_{tip}$ from 0 V to a negative value. Also, holes are injected into a domain with the tip potential set positive, and then the tip is made contact with the domain after the tip potential is set negative. Consequently, it is confirmed that the surface potential returns to 0 V to transfer the injected holes back to the probe.

FIGS. 10A to 10F show the fluorescence intensities corresponding to various values of the domain surface potential $V_s$. In FIGS. 10A to 10F, the peak at a wave-length of 530 nm indicates fluorescence from the S-150 in the neutral state, and the peak at a wavelength of 800 nm indicates fluorescence from the S-150 in the positively ionized state.

FIG. 10A shows the fluorescence spectrum observed when $V_s=0$ V ($V_{tip}=0$ to 1.1V). Fluorescence (peak wavelength 530 nm) from the S-150 in the neutral state is observed with an intensity corresponding to five molecules. FIG. 10B shows the fluorescence spectrum observed when $V_s=0.22$ V ($V_{tip}=1.1$ to 2.2 V). The fluorescence from the S-150 in the neutral state has an intensity corresponding to four molecules, and fluorescence (peak wavelength 800 nm) from the S-150 in the positively ionized state is observed with an intensity corresponding to one molecule. FIG. 10C shows the fluorescence spectrum observed when $v_s=0.44$ V ($V_{tip}=2.2$ to 3.3 V). The fluorescence from the S-150 in the neutral state has an intensity corresponding to three molecules, and the fluorescence from the S-150 in the positively ionized state has an intensity corresponding to two molecules. FIG. 10D shows the fluorescence spectrum observed when $V_s=0.66$ V ($V_{tip}=3.3$ to 4.4 V). The fluorescence from the S-150 in the neutral state has an intensity corresponding to two molecules, and the fluorescence from the S-150 in the positively ionized state has an intensity corresponding to three molecules. FIG. 10E shows the fluorescence spectrum observed when $V_s$=0.88 V ($V_{tip}$=4.4 to 5.5 V). The fluorescence from the S-150 in the neutral state has an intensity corresponding to one molecule, and the fluorescence from the S-150 in the positively ionized state has an intensity corresponding to four molecules. FIG. 10F shows the fluorescence spectrum observed when $V_s$=1.10 V ($V_{tip}$=5.5 to 6.6 V). No fluorescence from the S-150 in the neutral state is observed, and the fluorescence from the S-150 in the positively ionized state has an intensity corresponding to five molecules.

When $V_{tip}$ is further increased, the abrupt increase and the plateau of $V_s$ are periodically observed whenever $V_{tip}$ changes by +1.1 V, as when $V_{tip}$<6.6 V. However, no change is found in the fluorescence spectrum, i.e., only the fluorescence (peak wavelength 800 nm) from the S-150 in the positively ionized state is observed with an intensity corresponding to five molecules. Note that analogous fluorescence spectrum measurements are done by changing $V_{tip}$ from 0 V to a negative value, and the result is that only the fluorescence (peak wavelength 530 nm) from the S-150 in the neutral state is observed with an intensity corresponding to five molecules. Also, carriers are injected into a domain with the tip potential set positive, and then the tip is made contact with the domain after the tip potential is set negative. Consequently, it is confirmed that the state in which the fluorescence from the S-150 in the neutral state is observed with an intensity corresponding to five molecules is completely restored, and the recorded data is erased.

Example 5

A sample in which the thickness of a recording layer 4 having a domain structure is larger than that in Example 4 is manufactured. More specifically, the recording layer is formed following the same procedure as in Example 4 except that the evaporation time of an S-150 -doped diamine film is set to 1000 sec. The thickness of this recording layer corresponds to 20 nm. The structure of this recording layer is observed with an SEM, and it is confirmed that droplet domains 220 nm in diameter and 75 nm in height are present at a density of $1.2\times10^{13}$ $m^{-2}$. Approximately 2500 S-150 molecules are present as impurity molecules in each domain. In this domain structure the value of d/(Se) is $1.35\times10^{-4}$.

Figure 11:
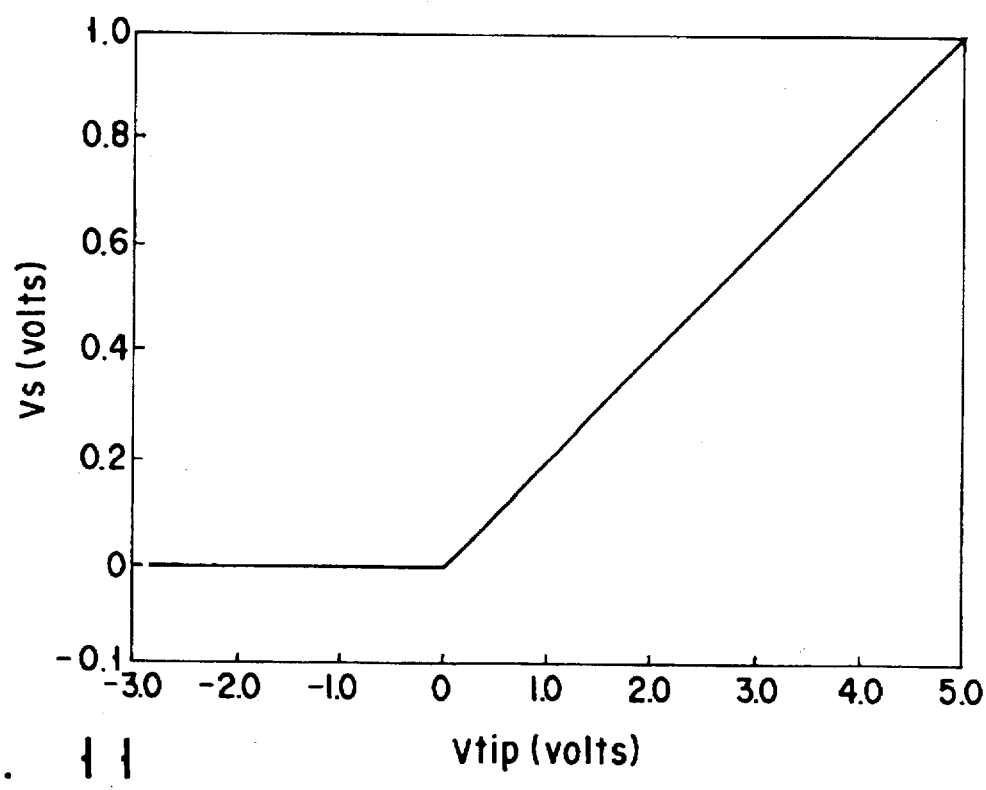
FIG. 11 is a graph showing the relationship between the tip potential and the domain surface potential for a recording medium of Example 5.
Figure 12A:
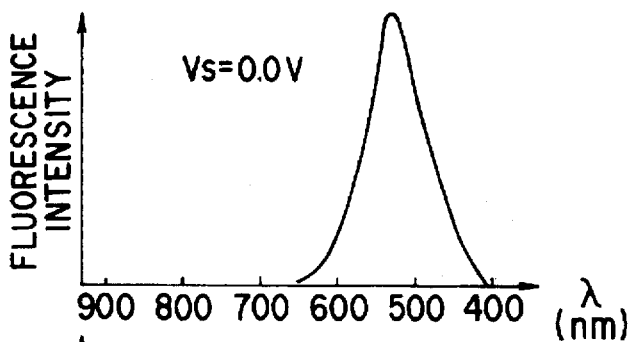
FIGS. 12A to 12E are graphs showing the fluorescence spectra observed at various domain surface potential values for the recording medium of Example 5.
Figure 12B:
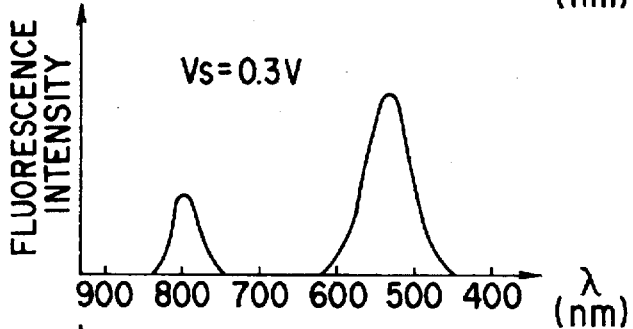
Figure 12C:
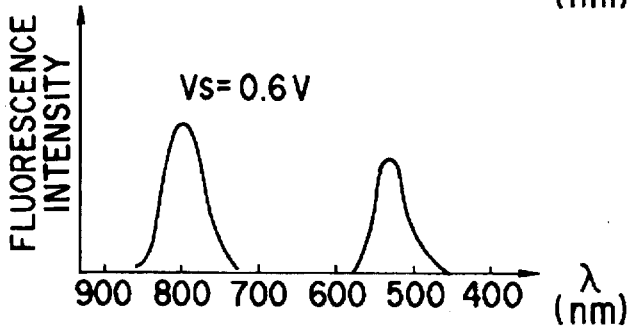
Figure 12D:
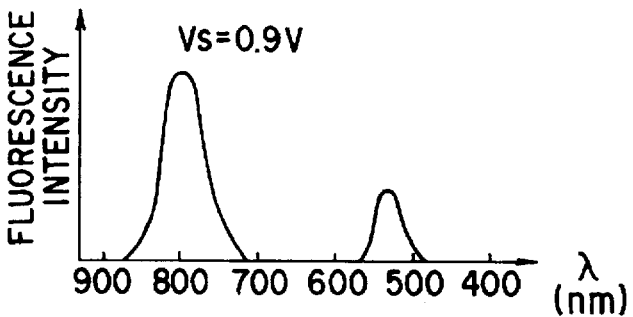
Figure 12E:
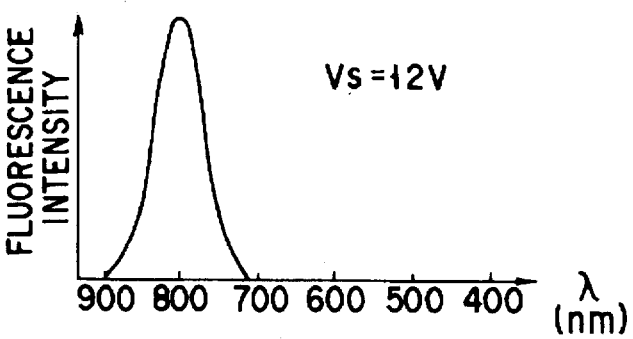

Injection of carriers from a cantilever tip, surface potential evaluation, and fluorescence spectrum measurement are performed for the resultant recording medium following the same procedure as in Example 4. FIG. 11 shows the relationship between the tip potential $V_{tip}$ during recording and the domain surface potential $v_s$ during reproduction. As in FIG. 11, $V_s$ continuously changes with $V_{tip}$ unlike in Example 4.

FIGS. 12A to 12E illustrate the fluorescence spectra corresponding to various values of the domain surface potential $v_s$. As in Example 4, as the value of $V_s$ increases from FIG. 12A to FIG. 12E, in the fluorescence spectra the fluorescence intensity from the S-150 in the neutral state decreases and the fluorescence intensity from the S-150 in the positively ionized state increases. However, the result is different from that of Example 4 in that the spectral change is continuous. Note that when $V_{tip}$ is 7 V or higher, the value of $V_s$ changes, but no change is found in the fluorescence spectrum, i.e., only the peak in the positively ionized state is observed.

Example 6

In this example, two-dimensional data write and read operations are performed by using the same sample as in Example 4. The tip is brought into contact with the sample and scanned on the sample while the load is held constant, performing a write action while the tip potential is changed from one location to another. More specifically, while the applied voltage $v_x$ for piezoelectric devices in the $\underline{x}$ axis direction and the applied voltage for piezoelectric devices in the $\underline{y}$ axis direction are changed as shown in FIGS. 13A and 13B, the data write is performed by scanning the probe at a scan rate of 2 μm/sec and moving the tip at a pitch of 50 nm in the $\underline{y}$ axis direction for each 1 sec. Also, $V_{tip}$ is changed as illustrated in FIG. 13C. That is, each time the tip is moved 50 nm in the $\underline{x}$ direction, $V_{tip}$ is discontinuously increased and then returned to 0 V. This operation is repetitively performed.

Figure 14A:
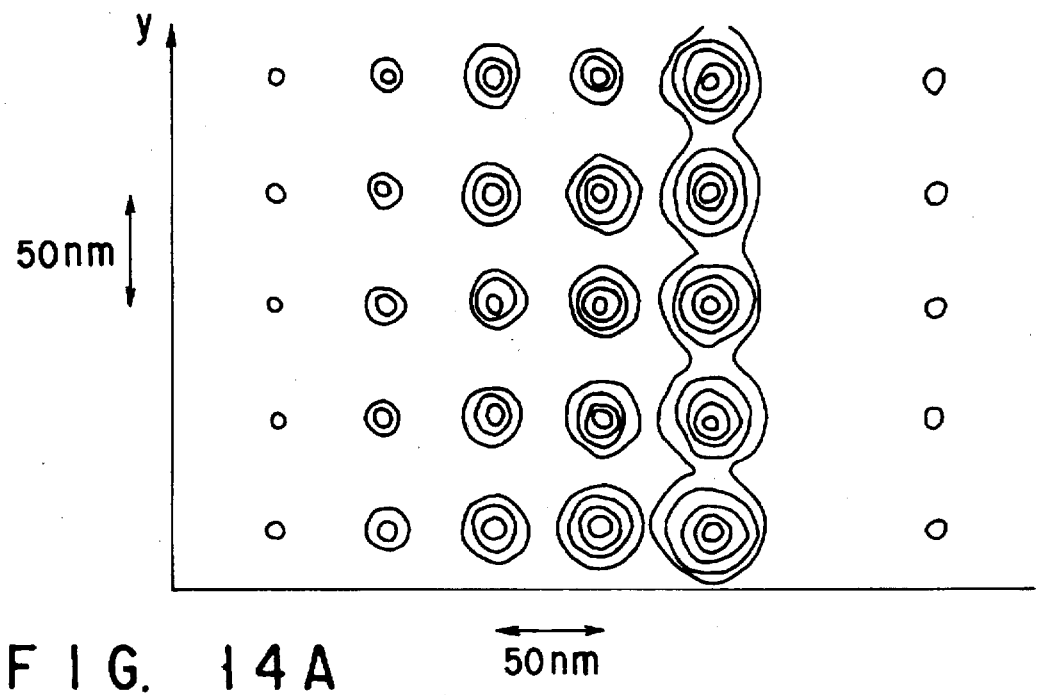
FIGS. 14A and 14B are views showing the two-dimensional distributions of fluorescence intensities at wavelengths of 800 nm and 530 nm, respectively, when the recorded data is read out from the recording medium of Example 6.
Figure 14B:
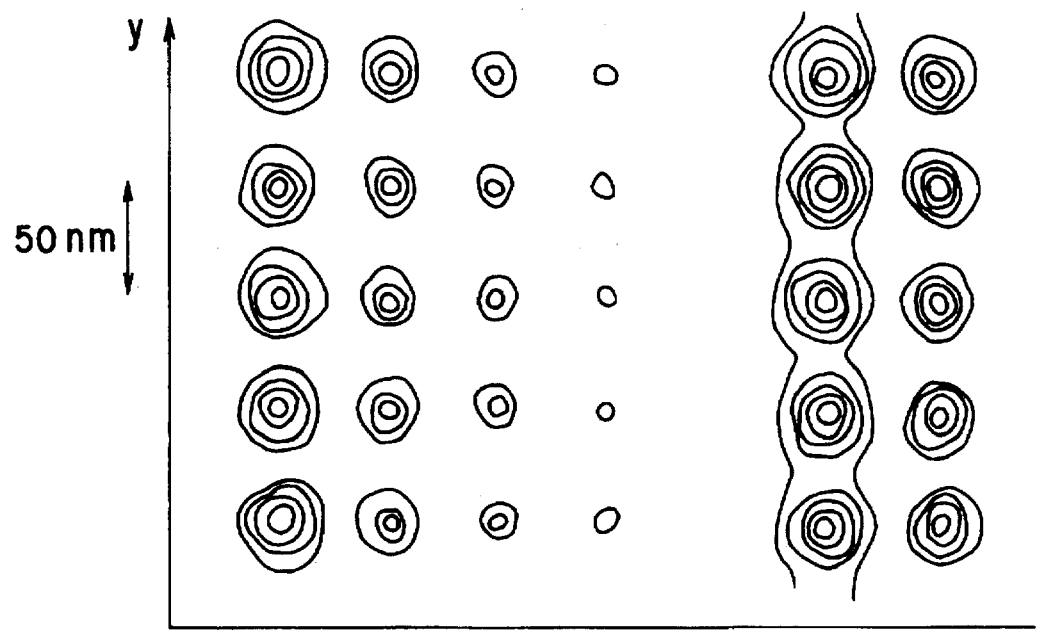

After the data write is performed as described above, the two-dimensional distribution of fluorescence is observed under irradiation of ultraviolet rays. The data read is performed by scanning the tip at a scan rate of 20 μm/sec in the $\underline{x}$ axis direction and moving the tip at a pitch of 50 nm in the $\underline{y}$ axis direction for each 1 sec. FIG. 14A shows the intensity distribution of fluorescence (peak wavelength 800 nm) from the S-150 in the positively ionized state. FIG. 14B shows the intensity distribution of fluorescence (peak wavelength 530 nm) from the S-150 in the neutral state. As is apparent from FIGS. 14A and 14B, the values of $V_{tip}$ in the recording, i.e., the fluorescence characteristics corresponding to the numbers of injected carriers are two-dimensionally read out.

Example 7

A recording medium is manufactured by using DNIBPC, an acceptor molecule, as a domain constituent material, and a phthaloperinone derivative as an impurity. The structure of the phthaloperinone derivative is presented later. The same type of a substrate as in Example 4 used. The evaporation conditions are that the degree of vacuum is $1.3\times10^{-4}$ Pa, the substrate temperature is 20° C., and the flow rate of the DNIBPC to the phthaloperinone derivative is set at 5000 : 1 by adjusting the respective Knudsen cell heating temperatures. The deposition rate of the DNIBPC is monitored using a quartz oscillator arranged near the Si substrate and found to be 0.02 nm/sec. In this example, a recording layer 4 corresponding to a thickness of 2.5 nm is formed by setting the evaporation time to approximately 125 sec. The structure of the recording layer 4 is observed with an SEM, and it is confirmed that droplet domains 40 nm in diameter and 10 nm in height are present at a density of $2.0\times10^{14}$ $m^{-2}$. The number of phthaloperinone derivative molecules present as an impurity in each domain is 6 on the average. The value of d/(Se) of the resultant recording medium is $4.07\times10^{-3}$.

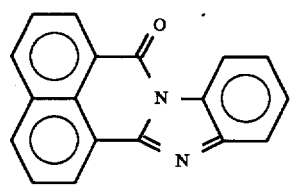

(phthaloperinone derivative)

The tip potential $V_{tip}$ in recording and the corresponding domain surface potential $V_s$ in reproduction are evaluated for the resultant recording medium following the same procedure as in Example 4. FIG. 15 shows the relationship between the tip potential $V_{tip}$ and the domain surface potential $V_s$ for the same domain. In contrast to Example 4, $V_s$ shows a stepwise change in a region in which the polarity of $V_{tip}$ is negative. That is, $V_s$ is 0 V when $V_{tip}$ ranges between 0 and −0.72 V, and discontinuously decreases to −0.14 V when $V_{tip}$ is −0.72 V. Thereafter, $V_s$ remains unchanged at −0.14 V when $V_{tip}$ ranges from −0.72 to −1.44 V, and again discontinuously decreases by −0.14 V to become −0.28 V when $V_{tip}$ is −1.44 V. In this manner, whenever $V_{tip}$ changes by −0.72 V the discontinuous decrease and the plateau of $V_s$ periodically appear. Note that no surface potential change is found in a region in which the polarity of $V_{tip}$ is positive. It is obvious from the polarity of the voltage that the carriers injected into the domain are electrons. Also, electrons are injected into a domain with the tip potential set negative, and then the tip is made contact with the domain after the tip potential is set positive. Consequently, it is confirmed that the surface potential returns to 0 V to transfer the injected electrons back to the probe.

FIGS. 16A to 16G show the fluorescence spectra corresponding to various values of the domain surface potential $V_s$. In FIGS. 16A to 16G, the peak at a wave-length of 550 nm indicates fluorescence from the phthaloperinone derivative in the neutral state, and the peak at a wavelength of 800 nm indicates fluorescence from the phthaloperinone in the negatively ionized state.

Figure 16A:
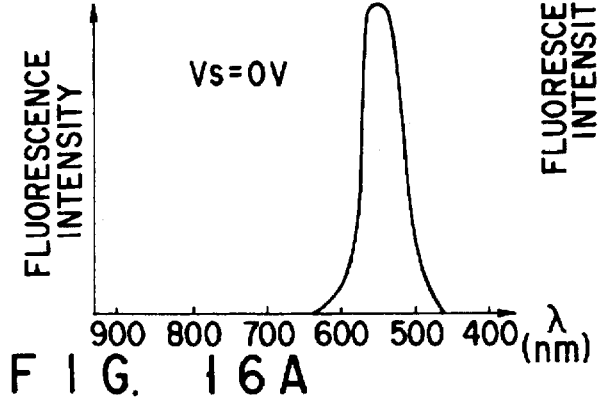
FIGS. 16A to 16G are graphs showing the fluorescence spectra observed at various domain surface potential values for the recording medium of Example 7.
Figure 16E:
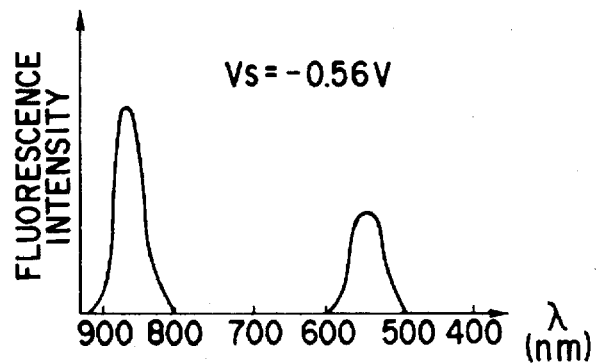
Figure 16B:
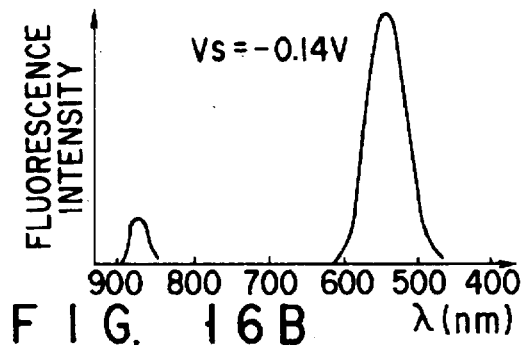
Figure 16F:
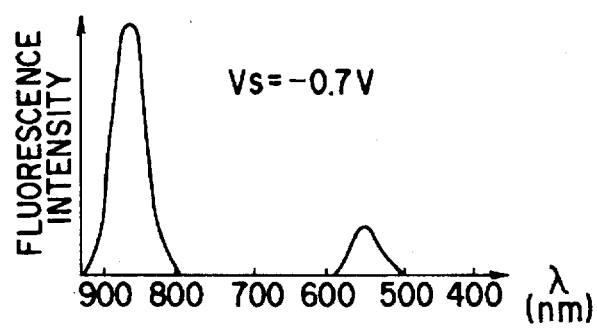
Figure 16C:
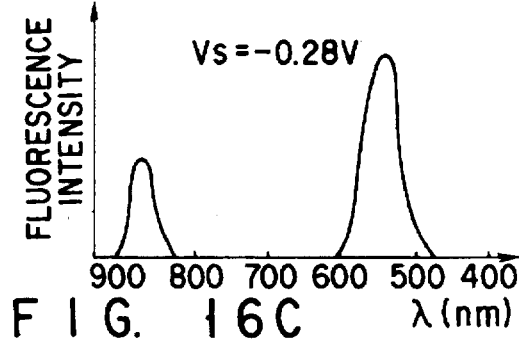
Figure 16D:
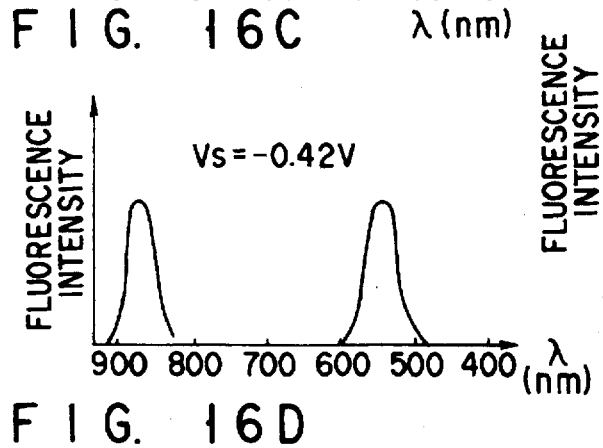
Figure 16G:
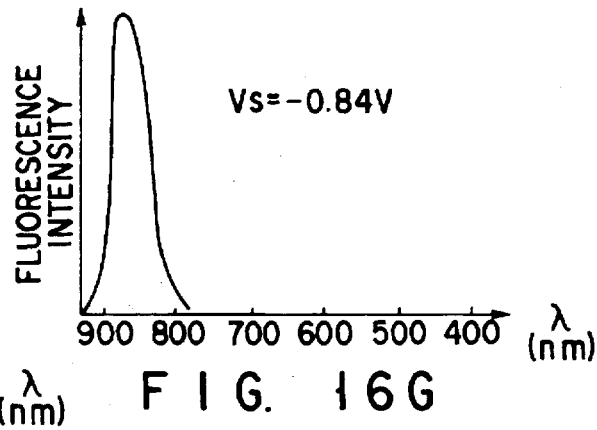

FIG. 16A shows the fluorescence spectrum observed when $V_s=0$ V ($V_{tip}=0$ to −0.72 V). Fluorescence (peak wavelength 550 nm) from the phthaloperinone derivative in the neutral state is observed with an intensity corresponding to six molecules. FIG. 16B shows the fluorescence spectrum observed when $V_s=-0.14$ V ($V_{tip}=-0.72$ to −1.44 V). The fluorescence from the phthaloperinone derivative in the neutral state has an intensity corresponding to five molecules, and fluorescence (peak wavelength 880 nm) from the phthaloperinone derivative in the positively ionized state is observed with an intensity corresponding to one molecule. Likewise, as illustrated in FIGS. 16C to 16G, whenever $v_s$ discontinuously decreases by −0.14 V, the fluorescence intensity from the phthaloperinone derivative in the neutral state decreases by a value corresponding to one molecule, and conversely the fluorescence intensity from the phthaloperinone derivative in the negatively ionized state increases by a value corresponding to one molecule.

When the value of $V_{tip}$ is further changed from −4.32 V in the negative direction, the discontinuous decrease and the plateau of $V_s$ are periodically observed. However, no change is found in the fluorescence spectrum, i.e., only the fluorescence (peak wavelength 880 nm) from the phthaloperinone derivative in the negatively ionized state is observed with an intensity corresponding to six molecules. Note that analogous fluorescence spectrum measurements are done by changing $V_{tip}$ from 0 V to a positive value, and the result is that only the fluorescence (peak wavelength 550 nm) from the phthaloperinone derivative in the neutral state is observed with an intensity corresponding to six molecules. Also, electrons are injected into a domain with the tip potential set negative, and then the tip is made contact with the domain after the tip potential is set positive. Consequently, it is confirmed that the state in which the fluorescence (peak wave-length 550 nm) from the phthaloperinone derivative in the neutral state is observed with an intensity corresponding to six molecules is completely restored, and the recorded data is erased.

What is claimed is:

1. A recording medium comprising:
   an underlying conductor layer;
   an insulating layer formed on said underlying conductor layer; and
   a recording layer formed with a domain structure capable of storing a carrier on said insulating layer,
   wherein said recording layer contains a donor organic molecule or an acceptor organic molecule, and the medium satisfies a relation represented by $$d/(S\epsilon) \geq 2.86 \times 10^{-3}$$

where $d$ (nm) is a thickness of said insulating layer, $\epsilon$ is a relative dielectric constant of said insulating layer, and S (nm$^2$) is an area of each domain constituting said recording layer.

2. The medium according to claim 1, wherein the area S (nm$^2$) of each domain constituting said recording layer is not more than 10,000.

3. The medium according to claim 1, wherein the surface of said insulating layer is subjected to hydrophobic treatment.

4. The medium according to claim 1, wherein an ionization potential of said donor organic molecule in the form of a solid crystal or a thin film is not more than 8 eV.

5. The medium according to claim 1, wherein an electron affinity of said acceptor organic molecule in the form of a solid crystal or a thin film is not less than 1 eV.

6. A recording/reproduction method for a recording medium according to claim 1, comprising the steps of:
   preparing a probe capable of being applied with a voltage;
   bringing said probe applied with a voltage into contact with a predetermined domain constituting a recording layer of said recording medium to perform recording by injecting a carrier into said domain;
   detecting the carrier injected into said domain by scanning said probe applied with a voltage in a state of noncontacting with said domain; and
   erasing the carrier injected into said domain by bringing said probe applied with a voltage having an opposite polarity to the polarity during the recording into contact with said domain.

7. The method according to claim 6, wherein a recording condition is set in accordance with the number of carrier injected into said domain.

8. The method according to claim 7, wherein the value depending on the carrier detected by scanning the probe in the state of noncontacting with the domain represents a stepwise change corresponding to the voltage applied to the probe during the recording.

9. A recording medium comprising:
   an underlying conductor layer;
   an insulating layer formed on said underlying conductor layer; and
   a recording layer formed with a domain structure on said insulating layer,
   wherein said recording layer contains a domain constituent material and an impurity whose molar ratio to said domain constituent material is not more than 10%, and a highest occupied molecular orbital of said impurity is higher in energy than a highest occupied molecular orbital of said domain constituent element, or a lowest unoccupied molecular orbital of said impurity is lower in energy than a lowest unoccupied molecular orbital of said domain constituent material.

10. The medium according to claim 9, wherein said domain constituent material contains a donor organic molecule or an acceptor organic molecule.

11. The medium according to claim 10, wherein an ionization potential of said donor organic molecule in the form of a solid crystal or a thin film is not more than 8 eV.

12. The medium according to claim 11, wherein the impurity is a stronger donor organic molecule than the domain constituent material containing a donor organic molecule.

13. The medium according to claim 10, wherein an electron affinity of said acceptor organic molecule in the form of a solid crystal or a thin film is not less than 1 eV.

14. The medium according to claim 13, wherein the impurity is a stronger acceptor organic molecule than the domain constituent material containing an acceptor organic molecule.

15. A medium according to claim 9, wherein said impurity is a fluorescent material.

16. The medium according to claim 9, wherein said domain constituent material is a non-fluorescent material or has a fluorescence excitation wavelength or a fluorescence wavelength which substantially does not overlap a fluorescence excitation wavelength or a fluorescence wavelength of said impurity.

17. A medium according to claim 9, wherein the medium satisfies a relation represented by $$d/(S\epsilon) \geq 2.86 \times 10^{-3}$$

where $d$ (nm) is a thickness of said insulating layer, $\epsilon$ is a relative dielectric constant of said insulating layer, and S (nm$^2$) is an area of each domain constituting said recording layer.

18. The medium according to claim 10, wherein the area S ($\mu m^2$) of each domain constituting said recording layer is not more than 10,000, and the surface of said insulating layer is subjected to hydrophobic treatment.

19. A recording/reproduction method for a recording medium according to claim 7, comprising the steps of:

preparing a probe capable of being applied with a voltage and capable of detecting fluorescence;

bringing said probe applied with a voltage into contact with a predetermined domain constituting a recording layer of said recording medium to perform recording by injecting a carrier into said domain;

scanning said probe and detecting fluorescence emitted from an impurity in said domain upon irradiation of exciting light and having a correlation with the carrier stored in said domain; and erasing the carrier injected into said domain by bringing said probe applied with a voltage having an opposite polarity to the polarity during the recording into contact with said domain.

20. The method according to claim 19, wherein a recording condition is set in accordance with the number of carrier injected into said domain.

* * * * *